(12) United States Patent
Andrade et al.

(10) Patent No.: US 9,003,357 B1
(45) Date of Patent: Apr. 7, 2015

(54) CODE GENERATION FOR QUERYING AN ACTIVE STATE OF A MODEL

(71) Applicant: The MathWorks, Inc., Natick, MA (US)

(72) Inventors: David B. Andrade, Brookline, MA (US); Srinath Avadhanula, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 70 days.

(21) Appl. No.: 13/966,881

(22) Filed: Aug. 14, 2013

(51) Int. Cl.
*G06F 9/44* (2006.01)

(52) U.S. Cl.
CPC ........................................ *G06F 8/35* (2013.01)

(58) Field of Classification Search
USPC ........................................................ 717/104
See application file for complete search history.

(56) References Cited

U.S. PATENT DOCUMENTS

| | | | |
|---|---|---|---|
| 5,708,594 A * | 1/1998 | Iwashita et al. .................. | 703/21 |
| 6,289,502 B1 * | 9/2001 | Garland et al. ................ | 717/104 |
| 6,880,147 B1 * | 4/2005 | Pauly ............................. | 717/104 |
| 7,503,027 B1 * | 3/2009 | Zhao et al. ..................... | 716/104 |
| 8,271,253 B2 * | 9/2012 | Ward ............................. | 703/14 |
| 8,640,100 B2 * | 1/2014 | Neumann et al. ............. | 717/124 |
| 2002/0083413 A1 * | 6/2002 | Kodosky et al. ............... | 717/109 |
| 2005/0131917 A1 * | 6/2005 | Auerbach ..................... | 707/100 |
| 2007/0044084 A1 * | 2/2007 | Wang et al. .................... | 717/151 |
| 2008/0288916 A1 * | 11/2008 | Tazoe et al. .................... | 717/105 |

OTHER PUBLICATIONS

"Stateflow and Stateflow Coder" Jan. 2003, MathWorks Inc., User's Guide, Version 5.*
Wasowski, "On Efficient Program Synthesis from Statecharts", Jun. 2003, ACM, LCTES'03.*

* cited by examiner

*Primary Examiner* — James D Rutten
(74) *Attorney, Agent, or Firm* — Harrity & Harrity, LLP

(57) ABSTRACT

A device may receive information that identifies a model of a finite state machine. The model may include information that identifies a group of leaf states. The group of leaf states may include states of the model with no child states. The device may determine, based on the information that identifies the model, a set of variables required to store information that identifies an active state of the model. The device may determine a numbering scheme for encoding the group of leaf states. The numbering scheme may be based on the set of variables. The device may encode the group of leaf states based on the numbering scheme. Encoding the group of leaf states may include generating and storing information indicating an association between a leaf state and a value.

20 Claims, 15 Drawing Sheets

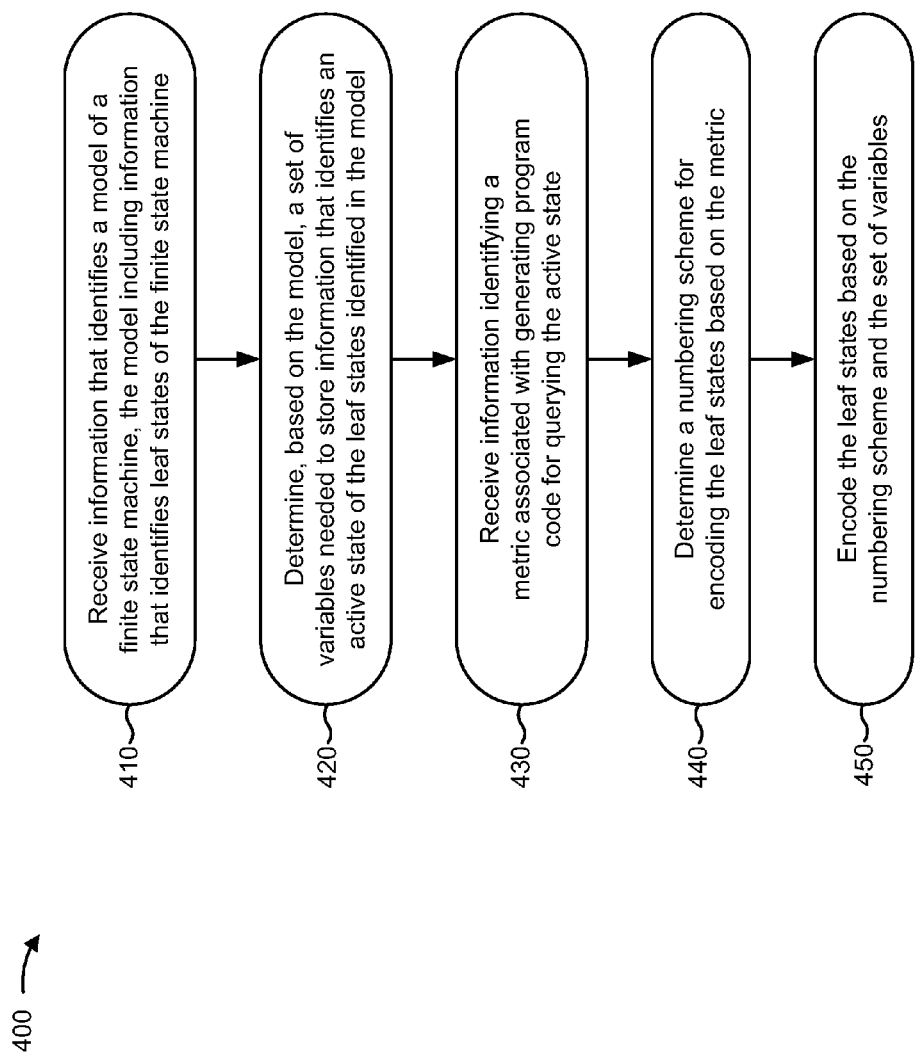

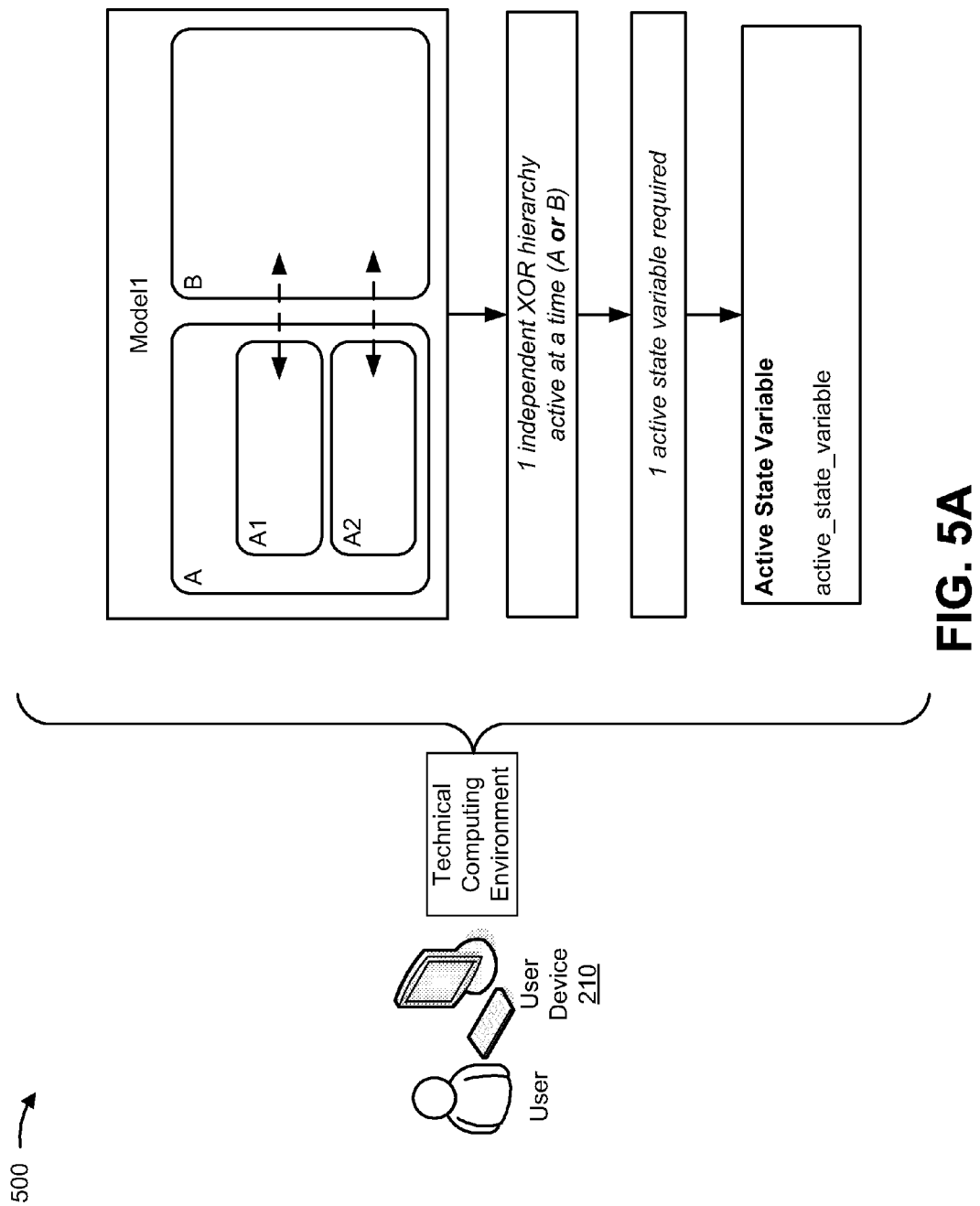

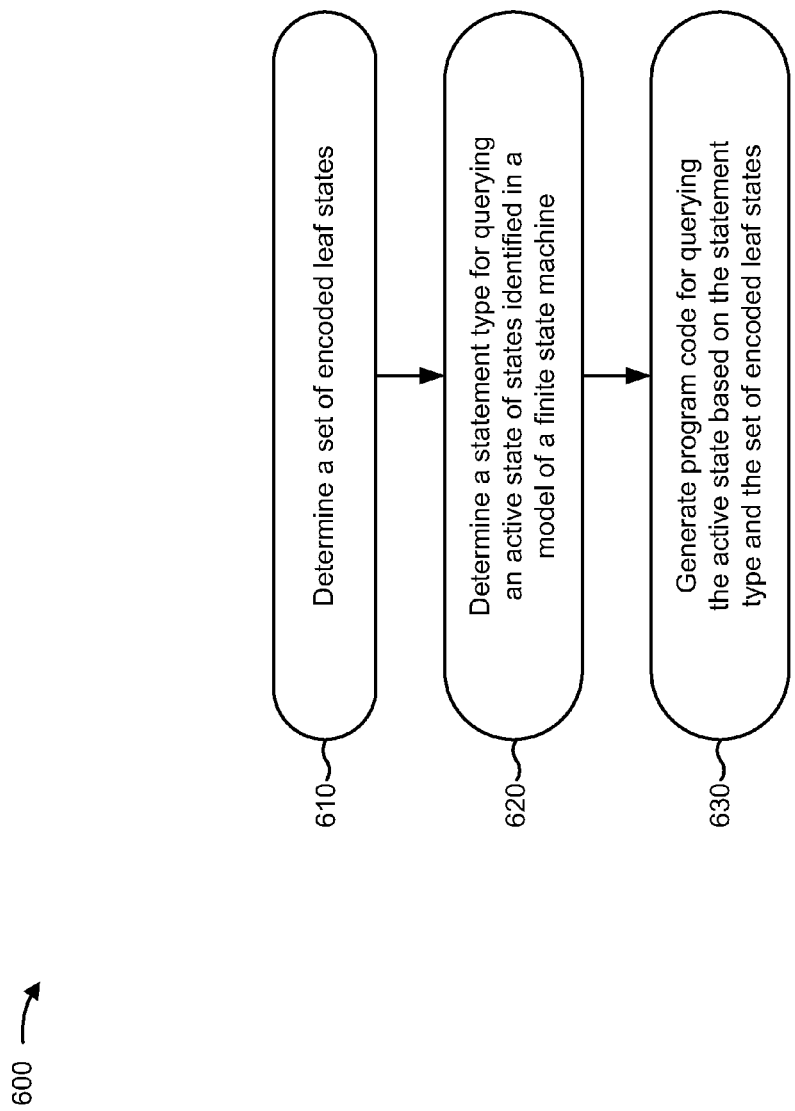

```
// Named constants (only leaf states get unique numbers)
#define IN_A1       ((uint8_T)1U)
#define IN_A2       ((uint8_T)2U)
#define IN_A3       ((uint8_T)3U)
#define IN_A_MIN    IN_A1
#define IN_A_MAX    IN_A3
```

```
void state_A_during() {
    switch(chart_active_leaf){
        case IN_A1:
            state_A1_during();
            break;
        case IN_A2:
            state_A2_during();
            break;
        default:
            state_A3_during();
    }
}
```

```
void fsm_during_logic() {
    if( chart_active_leaf <= IN_A_MAX ){
        // do things related to A being active
    }else if( chart_active_leaf <= IN_B_MAX ){
        // do things related to B being active.
    }else{
        // do things related to C being active.
    }
}
```

CODE GENERATION FOR QUERYING AN ACTIVE STATE OF A MODEL

BRIEF DESCRIPTION OF THE DRAWINGS

FIG. 4 is a flow chart of an example process for encoding leaf states of a model of a finite state machine;

FIGS. 5A and 5B are diagrams of an example implementation relating to the example process shown in FIG. 4;

FIG. 6 is a flow chart of an example process for generating program code for querying an active state of a model of a finite state machine;

FIGS. 9A and 9B are diagrams of an additional example implementation relating to the example processes shown in FIG. 4 and FIG. 6.

DETAILED DESCRIPTION

The following detailed description of example implementations refers to the accompanying drawings. The same reference numbers in different drawings may identify the same or similar elements.

A finite state machine may refer to a system that may be in one or more of a finite number of states at any given time, and may transition between states based on the occurrence of an event. The state of the finite state machine at a given point in time (e.g., a current time) may be referred to as an active state of the finite state machine at that point in time. The states of a finite state machine may be hierarchical, where a parent state is considered active when any of the child states of the parent state are active.

A user (e.g., a system designer) may model a finite state machine using modeling software. The user may wish to generate (e.g., using the modeling software) program code that, when executed, queries an active state of the states identified in the model. The user may also wish to generate program code that, when executed, uses a minimum amount of memory to store information identifying states of the model. The user may also wish to generate the program code based on a set of user preferences that may identify one or more metrics (e.g., an amount of power consumption, a quantity of memory usage, etc.) that are to impact how the program code is generated (e.g., such that the one or more metrics are minimized when the program code is executed). Implementations described herein may allow a user device to generate, based on one or more metrics, program code for querying an active state of a model that may reduce a quantity of memory used to identify an active state of the model.

Figure 1:
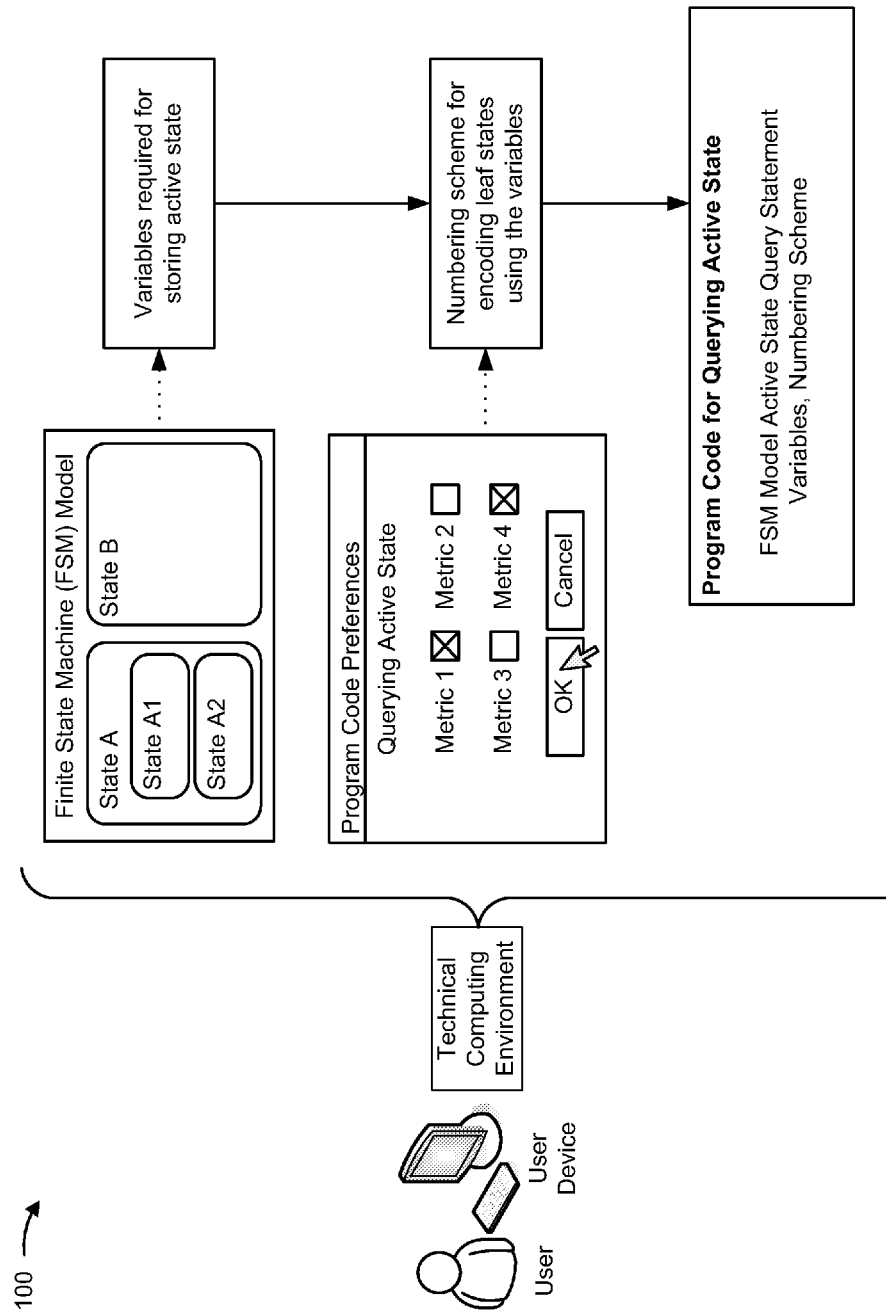
FIG. 1 is a diagram of an overview of an example implementation described herein.

FIG. 1 is a diagram of an overview of an example implementation 100 described herein. As shown in FIG. 1, implementation 100 may include a user interacting with a technical computing environment (TCE) of a user device. The user device may receive a finite state machine ("FSM") model, which may include a block diagram model, a flow chart, and/or program code that describes the finite state machine. For example, the user may interact with the user device to create and/or load the model.

As further shown in FIG. 1, the user device may determine a set of variables that are needed to store information that identifies an active state of the states identified in the model. The set of variables may be based on a hierarchy of the model (e.g., a relationship between two or more states, such as whether two or more states can be concurrently active, whether states are mutually exclusive, etc.). The user device may determine a set of variables that includes a quantity (e.g., a minimum quantity) of variables that are required to store information that identifies the active state of the model. For example, the quantity of variables may be equal to a quantity of independent mutually exclusive hierarchies included in the model (e.g., a quantity of hierarchies that may operate concurrently, where each of the quantity of hierarchies allows only one state, at each level of each hierarchy, to be an active state).

As further shown in FIG. 1, the user of the user device may provide (e.g., via a user interface) input indicating that one or more metrics are to impact how the user device generates program code for querying the active state of the model (e.g., identifying the active state of the model during operation of the model). As shown, the user device may determine, based on the one or more metrics and the set of variables, a numbering scheme for encoding (e.g., generating and/or storing information, associated with a variable, that may indicate an association between a state, included in the model, and an integer value) information that identifies the leaf states (e.g., states with no child states) of the model. The user device may then encode the leaf states based on the numbering scheme.

As further shown in FIG. 1, the user device may determine a statement type (e.g., an IF statement, a switch statement, etc.) to be included in program code for querying the active state of the model. The program code may be generated based on the encoded leaf states and the statement type. In this way, a user device may generate, based on one or more metrics, program code for querying an active state of a model that may reduce an amount of memory used to store information that identifies the active state.

Figure 2:
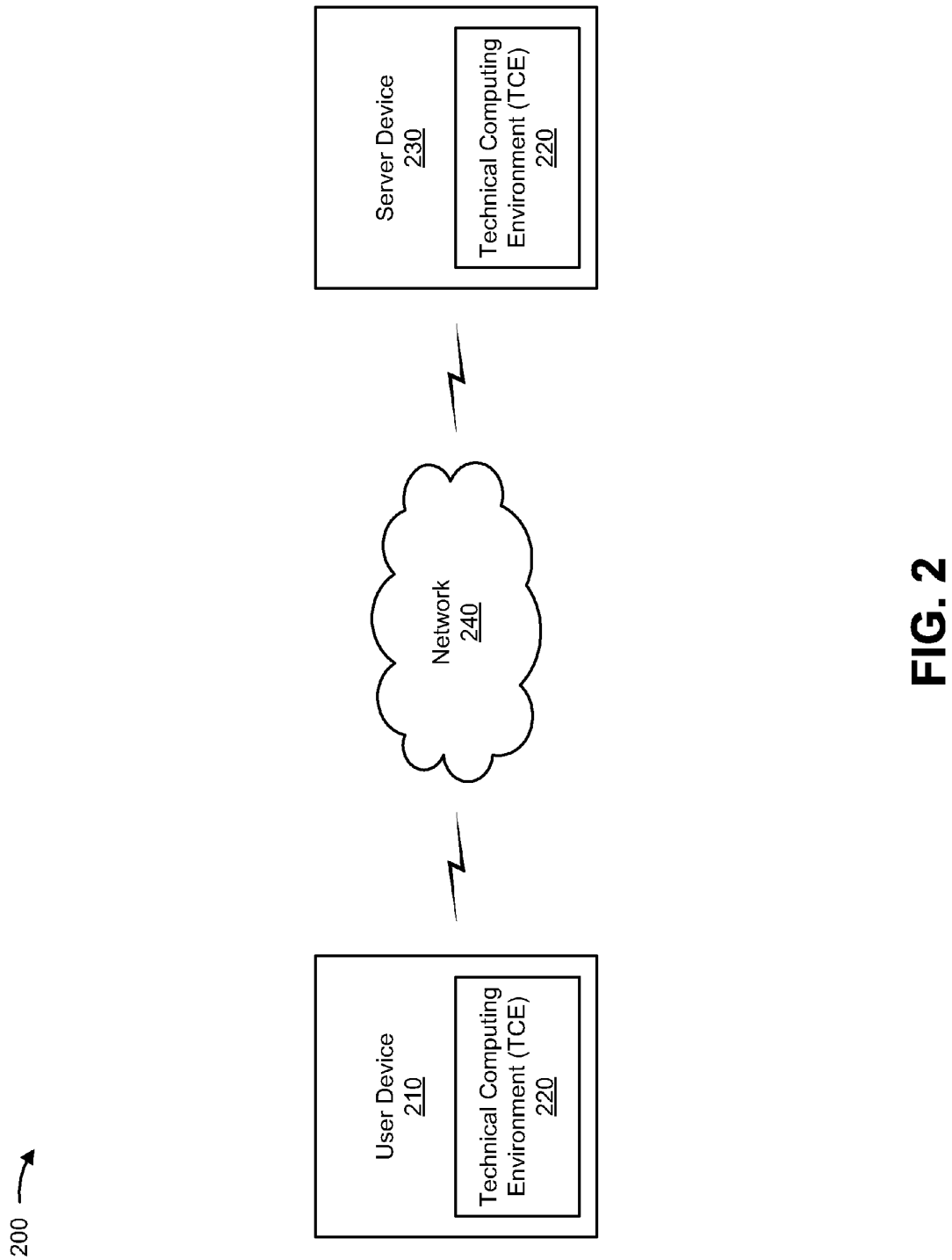
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

User device 210 may include a device capable of receiving, generating, processing, executing, and/or providing information associated with a model, such as a finite state machine model. For example, user device 210 may include a computing device (e.g., a desktop computer, a laptop computer, a tablet computer, a handheld computer, a server, etc.), a mobile phone (e.g., a smart phone, a radiotelephone, etc.), or a similar device. In some implementations, user device 210 may receive information from and/or transmit information to server device 230 (e.g., information associated with a finite state machine model).

User device 210 may host TCE 220. TCE 220 may include any hardware-based logic or a combination of hardware and software-based logic that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; StateWORKS Studio by State-WORKS, etc.), or another type of environment, such as a hybrid environment that may include, for example, a text-based environment and a graphically-based environment.

TCE 220 may include a modeling system that may be used in the creation of a functional model and that may enable generation of executable code based on the model. For example, TCE 220 may include a graphical modeling application that provides a user interface for a computing environment. Additionally, or alternatively, TCE 220 may include a graphical modeling application that provides a user interface for modeling and/or simulating (e.g., by executing a model) a dynamic system (e.g., based on differential equations, difference equations, algebraic equations, discrete events, discrete states, stochastic relations, etc.). A dynamic system (either natural or man-made) may include a system, where a response of the system at any given time may be a function of input stimuli associated with the system, a current state associated with the system, and/or a current time.

The system represented by a model may have various execution semantics that may be represented in the model as a collection of modeling entities, often referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice. A block may be hierarchical in that the block itself may comprise one or more blocks that make up the block.

A graphical model (e.g., a functional model) may include entities with relationships between the entities, and the relationships and/or the entities may have attributes associated with them. The entities my include model elements, such as blocks and/or ports. The relationships may include model elements, such as lines (e.g., connector lines) and references. The attributes may include model elements, such as value information and meta information for the model element associated with the attributes. A graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may consist, for example, of blocks connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, a sender port, a receiver port, an exception port, an error port, a physics port, an entity flow port, a data flow port, a control flow port, etc.

Relationships between blocks may be causal and/or non-causal. For example, a model (e.g., a functional model) may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

As another example, TCE 220 may include a state machine model (e.g., a graphical state machine model). The state machine model may include an executable time-based model. The state machine model may include a discrete-state transition system that evaluates transitions at particular points in time. The points in time may be based on a periodic and/or discrete sample time, or the points in time may be based on a change of a truth value of an expression (e.g., an inequality). An evaluation of the transition system may be associated with the occurrence of an event, and the evaluation may consist of determining whether a transition out of a state is enabled. A transition may be enabled when associated event(s) occur and/or when associated condition(s) are satisfied. The state transition system may include input and output variables that may be obtained from and/or provided to graphical entities in a graphical model (e.g., the state machine model). The graphical entities may represent time-based dynamic systems, such as differential equation systems. In some embodiments, the graphical model and the graphical entities may represent a multi-domain dynamic system. The domains may include execution domains such as, for example, continuous time, discrete time, discrete event, state transition system, and/or a model of computation. The model of computation may be based on differential equations, difference equations, algebraic equations, discrete events, discrete states, stochastic relations, data flows, synchronous data flows, control flows, process networks, and/or state machines.

Server device 230 may include one or more devices capable of receiving, generating, storing, processing, and/or providing information associated with a model, such as a finite state machine model. For example, server device 230 may include a computing device, such as a server, a desktop computer, a laptop computer, a tablet computer, a handheld computer, or a similar device. In some implementations, server device 230 may host TCE 220.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
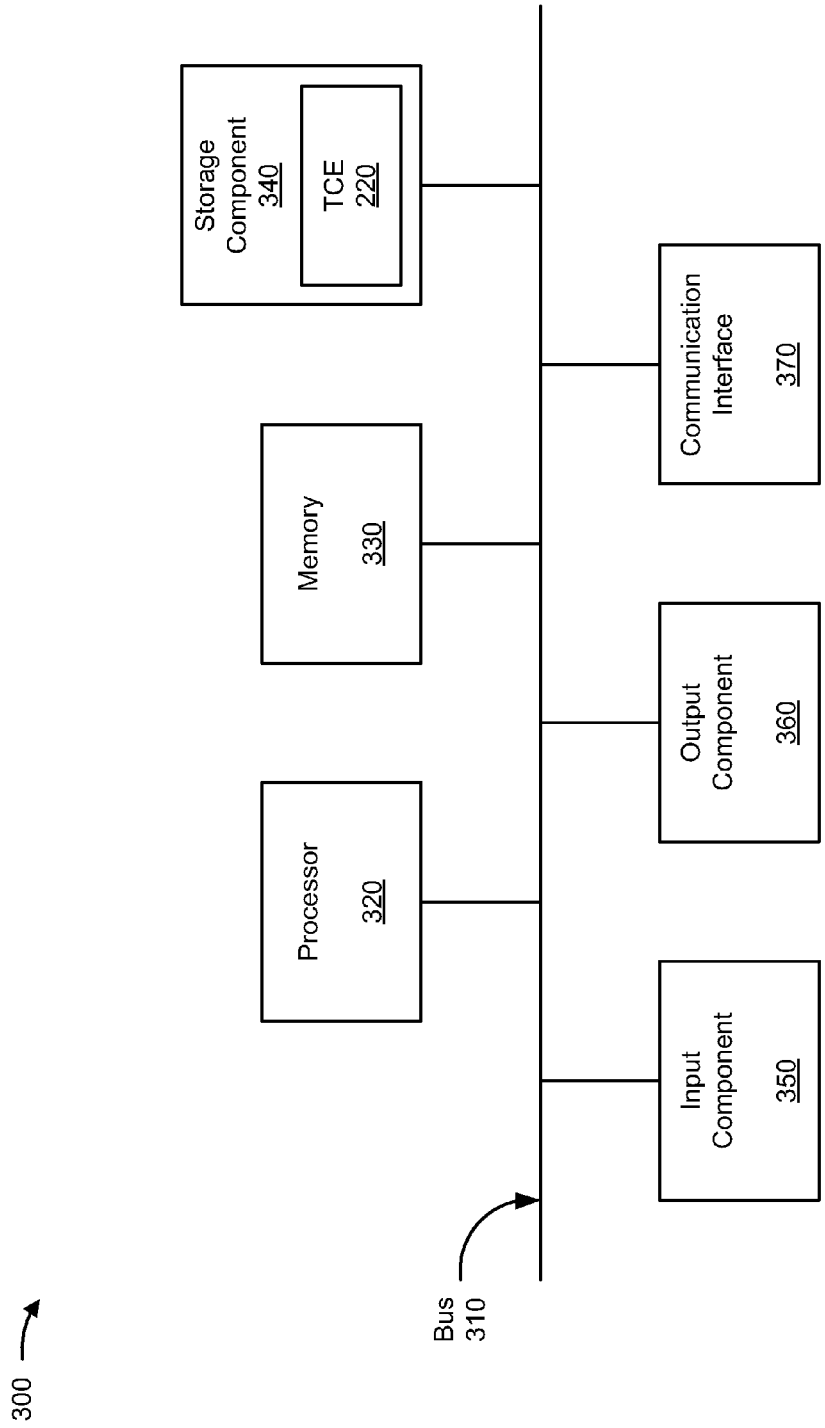
FIG. 3 is a diagram of example components of one or more devices of FIG. 2.

FIG. 3 is a diagram of example components of a device 300, which may correspond to user device 210 and/or server device 230. In some implementations, each of user device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing logic (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, or the like.

Device 300 may perform various operations described herein. Device 300 may perform these operations in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for encoding leaf states of a model of a finite state machine. In some implementations, one or more process blocks of FIG. 4 may be performed by user device 210. In some implementations, one or more process blocks of FIG. 4 may be performed by another device or a group of devices separate from or including user device 210, such as server device 230.

As shown in FIG. 4, process 400 may include receiving information that identifies a model of a finite state machine, the model including information that identifies leaf states of the finite state machine (block 410). For example, user device 210 may receive information that identifies a model of a finite state machine ("FSM") from a user and/or from another device (e.g., server device 230). In some implementations, the user may interact with user device 210 (e.g., via TCE 220) to create, edit, and/or load the FSM model. The FSM model may include, for example, a block diagram model, a mathematical model, a flow chart, and/or program code that describes the FSM model.

A finite state machine may refer to a system that may be in one or more of a finite number of states at any given time, and may transition between states based on the occurrence of an event. A state may refer to a status of a system that is waiting to execute a transition to another state. The FSM model may describe one or more possible states (e.g., all possible states) of the finite state machine, and may also describe events that trigger a transition from one state to another state (e.g., transition events that trigger a state transition). For example, an event may be triggered when a set of conditions is satisfied. Additionally, or alternatively, a transition between states may be triggered based on the occurrence of an event and/or a set of conditions being satisfied. In some implementations, the FSM model may include a state transition table that identifies a state to which the FSM will transition, based on the current state (e.g., the active state) and another input (e.g., an event, a condition, etc.). The current state, or the state of the finite state machine at a particular time, may be referred to as the active state of the FSM model.

The FSM model may describe a hierarchy of states of the finite state machine. For example, the hierarchy of states may include parent states and sub-states of the parent states. Each parent state may have multiple sub-states, and each sub-state may have a single parent state. A sub-state may be a child state of a parent state. The child state may be directly associated (e.g., linked) to the parent state, with no intervening states.

The hierarchy of states may also include one or more top-level or first-level states (e.g., states with no parent state), one or more second-level states (e.g., child states of the first-level states), one or more third-level states (e.g., child states of the second-level states), etc. A sub-state of a higher-level state may include any lower-level state that depends on the higher-level state. A bottom-level state may refer to a state with no child states (e.g., a state that is not a parent state), and may be referred to herein as a leaf state. A parent state of the FSM model may be considered an active state when any sub-state (e.g., a child state, a grandchild state, etc.) of the parent state is an active state of the FSM model.

A model has decomposition when the model includes at least one top-level state. A state has decomposition when the state consists of one or more sub-states. The decomposition of a state and/or model may be identified as exclusive (OR) ("XOR") decomposition or parallel (AND) decomposition.

An XOR decomposition may be used to describe operating modes of the FSM model that are mutually exclusive. For example, when a model has XOR decomposition, only one top-level state of the model can be active at a time. Additionally, when a state, and all sub-states of the state, have XOR decomposition, only one state at any level can be active at a time (e.g., only one child state of the state can be active, only one grandchild state can be active at a time, etc.). For example, if a parent state with XOR decomposition has three child states, then only one of the three child states may be active at a time. However, the parent state and one of the child states may both be active at the same time (e.g., because a parent state may be considered an active state when any sub-state of the parent state is an active state). In some implementations, TCE 220 may identify states associated with XOR decomposition using solid lines.

A parallel (AND) decomposition may be used to describe operating modes of the FSM model that may operate concurrently. When a model has parallel (AND) decomposition, two or more (e.g., all) top-level states of the model may be active at the same time (e.g., concurrently). When a state has parallel (AND) decomposition, two or more child states (e.g., all child states) of the state may be active at the same time. For example, if a parent state with parallel (AND) decomposition has two child states, then both of the child states may be active at the same time. In some implementations, TCE 220 may identify states associated with parallel (AND) decomposition using dashed lines.

In some implementations, the model may include a section that has XOR decomposition and a section that includes parallel (AND) decomposition. In some implementations, the model may include one or more states with XOR decomposition and/or one or more states with parallel (AND) decomposition.

As further shown in FIG. 4, process 400 may include determining, based on the model, a set of variables needed to store information that identifies an active state of the leaf states identified in the model (block 420). For example, user device 210 may determine a set of variables needed to store information that identifies the active state of the leaf states identified in the model received by user device 210.

In some implementations, user device 210 may determine the set of variables when user device 210 receives the model. In some implementations, user device 210 may determine the set of variables when the model is updated (e.g., when a user of user device 210 modifies the model, when an updated model is received, from server device 230, by user device 210, etc.). In some implementations, user device 210 may determine the set of variables based on input provided (e.g., via user device 210) by the user of user device 210. For example, the user may provide input indicating that user device 210 is to determine the set of variables (e.g., when a user indicates that program code, for querying the active state of the model, is to be generated and/or executed).

A set of variables may include one or more variables that may be used to store information that identifies the active state of the one or more leaf states included in the model. For example, the set of variables may include one or more variables, and each of the one or more variables may be identified by a string of characters (e.g., a string of characters associated with the model, a string of characters associated with a state of the model, etc.). In some implementations, each of the one or more variables may be used to store a value (e.g., an integer value) indicating that a particular leaf state, associated with the value, is the active state of the model.

In some implementations, the set of variables may be determined based on a decomposition of the model and/or a decomposition of one or more states identified in the model. As discussed elsewhere herein, if a section of the model includes a parent state that has XOR decomposition, then only one child state of the parent state can be active at a time. Therefore, information indicating which leaf state is the active leaf state (e.g., a state with no children) is the only information required to identify the active state of the section of the model having XOR decomposition (e.g., one variable is required to determine the active leaf state of the XOR hierarchy because only one leaf state can be active at a time).

As also discussed elsewhere herein, if a section of the model includes a parent state that has parallel (AND) decomposition, then all child states of the parent state may be concurrently active. Furthermore, each concurrently active child state that has XOR decomposition (e.g., each child state, that has XOR decomposition, that is also a parent) may have an active leaf state. As such, knowledge of which leaf state is active, within the XOR hierarchy of each concurrently active child state, is required to identify the active state of the section of the model. In sum, the set of variables (e.g., the quantity of variables) required to store information that identifies the active state of the model may be equal to the quantity of states, having XOR decomposition, that can be concurrently active.

Stated another way, if a parent state has XOR decomposition, then the quantity of variables required to store information identifying the active state of the parent state is a quantity of variables equal to the maximum quantity of variables required by any one child of the parent state. However, if a parent state has parallel (AND) decomposition, then the quantity of variables required to store the information identifying the active state of the parent state is a quantity of variables equal to a sum of a quantity of variables required by each child of the parent state.

In some implementations, a variable, of the set of variables, may be shared by multiple parent states (e.g., where the multiple parent states, and sub-states of the parent states, have only XOR decomposition). In other words, a memory location (e.g., a memory location used to store information associated with the variable) may be used to store information identifying the active child state of multiple parent states.

As an example, assume that a model includes two top level states, identified as A and B. Further, assume that the model has parallel (AND) decomposition (e.g., A and B may be concurrently active). Also, assume that A has XOR decomposition, and assume A is a parent of two child states, identified as A1 and A2 (e.g., A1 cannot be active when A2 is active, A2 cannot be active when A1 is active). Finally, assume that B has XOR decomposition, and assume that B is a parent of two child states, identified as B1 and B2 (e.g., B1 cannot be active when B2 is active, B2 cannot be active when B1 is active).

One leaf state of A (e.g., A1 or A2) can be active at a time because of the XOR decomposition of state A. Therefore, only one variable is required to identify the active leaf state of state A. Similarly, one leaf state of B (e.g., B1 or B2) can be active at a time because of the XOR decomposition of state B. Therefore, only one variable is required to identify the active leaf state of state B.

As discussed, the overall model has parallel (AND) decomposition (e.g., state A and state B may be concurrently active), and the model includes two parent states (e.g., A and B) that each have XOR decomposition (e.g., only A1 or A2 can be active at a time, and only B1 or B2 can be active at a time). As such, there are two independent XOR hierarchies that may be concurrently active (e.g., the state A XOR hierarchy and the state B XOR hierarchy). Therefore, two variables are required to identify the active state of the model (e.g., a variable is required to identify the active leaf state of A, and a variable is required to identify the active leaf state of B).

As further shown in FIG. 4, process 400 may include receiving information identifying a metric associated with generating program code for querying the active state (block 430). For example, user device 210 may receive information identifying a metric associated with generating program code for querying the active state of the model received by user device 210. In some implementations, user device 210 may receive the information identifying the metric based on input from a user, provided via a user interface displayed on user device 210. Additionally, or alternatively, user device 210 may receive the information identifying the metric from another device (e.g., server device 230). In some implementations, user device 210 may receive information identifying a default metric associated with generating the program code (e.g., when the user of user device 210 does not provide input identifying the metric).

A metric may refer to information associated with one or more factors that the user may wish to impact how program code, for querying the active state of the model, is generated. For example, the metric may include a factor associated with a quantity of power required to execute the program code (e.g., an amount of power consumption, a hamming distance, etc.), a factor associated with a speed at which the program code may be executed (e.g., an execution speed), a factor associated with the structure and/or operation of the model (e.g., a topographic proximity of states included in the model, a sequence of transitions included in the model, an amount of coverage, etc.), a factor associated with a quantity of memory required to store and/or execute the program code (e.g., a quantity of read-only memory ("ROM"), a quantity of random access memory ("RAM"), etc.), a factor associated with the text of the program code (e.g., readability of the program code), or the like.

An amount of power consumption may refer to a metric associated with a quantity of power that that is required to execute the program code. For example, the user of user device 210 may wish to minimize the amount of power consumption required to execute the program code (e.g., where the program code may be executed by a device with a limited battery life, etc.). In some implementations, the amount of power consumption may be associated with one or more other metrics (e.g., an execution speed, a hamming distance, etc.).

An execution speed may refer to a metric associated with a speed at which the program code may be executed by user device 210. For example, a user of user device 210 may wish for the execution speed of the program code to be maximized. In some implementations, the execution speed may be maximized when the program code for querying the active state includes a statement type (e.g., a switch statement) that may facilitate identifying the active state of the model (e.g., using a jump table). In some implementations, a particular statement type (e.g., a switch statement) may be used to maximize execution speed.

A hamming distance may refer to a metric associated with a quantity of bit flips required to change a variable, from storing information that identifies a first state as the active state, to store information that identifies a second state as the active state. For example, the variable may have a value of 1U (e.g., represented in binary form as 01) that identifies that the first state is the active leaf state. The second state may become the active state of the model (e.g., based on a transition to the second state during the operation of the model), and the value of the variable may change to 3U (e.g., represented in binary form as 11). In this example, the transition from the first state to the second state requires the value of the variable to change (e.g., from 1U to 3U), and one bit flip (e.g., from 01 to 11) is required to change the value of the variable. In some implementations, the user of user device 210 may wish to minimize the hamming distance (e.g., to reduce power consumption, to increase execution speed, etc.). In some implementations, the user may wish to maximize the hamming distance (e.g., to detect and/or reduce errors).

A topographic proximity may refer to a metric associated with a quantity of transitions required to connect two states. In some implementations, a user may wish for user device 210 to determine a numbering scheme where the states are organized based on the smallest number of transitions between states included in a model. For example, a first state may transition to a second state, and the second state may transition to a third state. The first state is one transition from the second state, and the first state is two transitions from the third state. As such, the first state may be adjacent to the second state (e.g., rather than the third state), within the numbering scheme used to encode the leaf states and/or the program code for querying the active state of the model.

A quantity of ROM may refer to a metric associated with a quantity of ROM that is required to store information associated with querying the active state of the model (e.g., an amount of ROM required to store the program code for querying the active state). For example, a user may wish for user device 210 to generate program code that minimizes the amount of ROM used to store (e.g., in a memory location of a microprocessor) the program code for querying the active state. In some implementations, the quantity of ROM required to store information associated with querying the active state of the model may be associated with a type of statement (e.g., an if statement) included in the program code (e.g., where an if statement may require less ROM than a switch statement, etc.). In some implementations, reducing the quantity of ROM may affect another metric (e.g., reducing the quantity of ROM by using an if statement may result in a reduction in execution speed).

A quantity of RAM may refer to a metric associated with a quantity of RAM that is required to store information associated with querying the active state of the model (e.g., an amount of RAM required to store information associated with identifying the active state when the program code is executed). For example, a user may wish for user device 210 to generate program code that minimizes the amount of RAM that may be required to store information associated with querying the active state. In some implementations, a particular statement type (e.g., a switch statement) may be used based on the metric associated with the quantity of RAM (e.g., where the user wants to minimize the quantity of RAM used to store the information).

An amount of coverage may refer to a metric associated with a quantity and/or a percentage of time during which a state is active. For example, a user may wish for user device 210 to generate program code that, when querying the active state, may determine whether a first leaf state is active (e.g., the program code may determine whether the first state is active before determining whether a second state is active) based on an amount and/or a percentage of time that the first state is active (e.g., where the particular state is active 90% of the time that the model is operating, the program code may determine whether the particular state is active before determining whether another state is active). In some implementations, the amount of coverage may be associated with another metric (e.g., an execution speed, a power consumption, etc.).

Readability of the program code may refer to a metric associated with generating program code that may be easily read and/or understood by the user. For example, a user may wish for user device 210 to generate program code that, when read by the user, may be organized (e.g., by determining a particular numbering scheme) in such a way that a logical flow of program code may be easily discerned when read by the user (e.g., the program code may be organized in such a way that it matches the flow of the model as created by the user). In some implementations, user device 210 may improve the readability of the program code by defining a boundary, associated with a leaf state, that may be included in the program code. For example, where a range of values (e.g., 1U-6U) corresponds to a range of leaf states (e.g., A1-A6) associated with a state (e.g., A), user device 210 may define a minimum value (e.g., A_min=1=1U) and a maximum value (e.g., A_max=A6=6U). The minimum value and the maximum value may be included in the program code for querying the active state (e.g., if (A_min≤variable≤A_max)→//State A program code, etc.) in such a way to improve user readability.

In some implementations, the metric may impact how user device 210 generates the program code for querying the active state of the model. In some implementations, the metric may affect the statement type (e.g., an if statement, a switch statement, etc.) and/or the numbering scheme (e.g., a numbering scheme used to encode the leaf states of the model) associated with the program code. For example, if a metric, identified by the user, indicates that an amount of ROM used to store the program code is to be minimized, then a numbering scheme and/or a statement type may be used to generate the program code such that the quantity of ROM required to store the program code is minimized. In some implementations, one or more metrics may be identified by the user via user device 210. In some implementations, user device 210 may receive information indicating a weight that is to be assigned to one or more metrics, and the weight assigned to each of the one or more metrics may impact how user device 210 generates the program code (e.g., a metric with a heavy weight may have more impact than a metric with a lightweight, etc.).

Program code for querying the active state may include a set of instructions that, when executed, may determine information indicating that one or more states, of the states included in a model, are active. In some implementations, the program code for querying the active state may be combined (e.g., by a user of user device 210) with another program code (e.g., program code that includes instructions associated with the operation of the model when a particular state of the model is active). In some implementations, the program code for querying the active state may provide a result that may indicate that a leaf state, of the states included in the model, is an active leaf state.

As further shown in FIG. 4, process 400 may include determining a numbering scheme for encoding the leaf states based on the metric (block 440). For example, user device 210 may determine a numbering scheme for encoding the leaf states of the model received by user device 210. In some implementations, user device 210 may determine the numbering scheme when user device 210 receives the information identifying the metric. Additionally, or alternatively, user device 210 may determine the numbering scheme when user device 210 receives information, associated with the model and/or the metric, from another device (e.g., server device 230). In some implementations, user device 210 may determine the numbering scheme prior to executing the model.

In some implementations, the numbering scheme may include information identifying a set of leaf states, in the form of an organized series of words and/or characters, associated with each of the leaf states included in the model (e.g., a list of leaf state identifiers, a table including leaf state identifiers, etc.). Additionally, or alternatively, the numbering scheme may include a set of values (e.g., integer values) that correspond to the set of leaf states included in the numbering scheme. For example, a first leaf state of the set of leaf states may be associated with a first value, a second leaf state may be associated with a second value, etc.

In some implementations, user device 210 may determine the organization of the numbering scheme based on the information identifying the metric received by user device 210. For example, user device 210 may receive information indicating that a particular metric (e.g., topographic proximity, hamming distance, etc.) is to impact how the program code is generated, and user device 210 may determine the numbering scheme based on the information associated with the particular metric. In some implementations, user device 210 may perform an analysis and/or a simulation, based on the metric, to determine the numbering scheme (e.g., where the metric is associated with coverage, user device 210 may analyze and/or simulate the model to determine an amount of coverage associated with each state included in the model, etc.). In some implementations, user device 210 may receive information indicating that two or more metrics are to impact how the program code is generated, and user device 210 may determine the numbering scheme based on the two or more metrics.

In some implementations, user device 210 may determine the organization of the numbering scheme based on the set of leaf states included in the model. For example, user device 210 may determine the set of leaf states (e.g. may determine which states are leaf states) included in the model, and may determine the numbering scheme for encoding the leaf states based on determining the set of leaf states. Additionally, or alternatively, the organization of the numbering scheme may be based on a hierarchy and/or a structure included in the model. For example, two leaf states that have a common parent state may be numbered and/or listed consecutively within the numbering scheme. Additionally, or alternatively, the organization of the numbering scheme may be based on the operation of the model. For example, two leaf states that have a common transition (e.g., where one leaf state may transition to another leaf state during operation of the model) may be numbered and/or listed consecutively within the numbering scheme.

In some implementations, user device 210 may determine one or more numbering schemes based on the set variables required to store information that identifies an active leaf state of the model (e.g., each variable required to store information that identifies an active leaf state may have a separate numbering scheme). In some implementations, the user of user device 210 may provide input indicating the organization of the numbering scheme (e.g., by providing, via user device 210, input that indicates an order in which each leaf state, of the set of leaf states, is to be numbered).

As discussed in the example above, assume a model includes two top level states, identified as A and B, and that the model has parallel (AND) decomposition. Also, assume that A has XOR decomposition, and assume A is a parent of two child states, identified as A1 and A2. Further, assume that B has XOR decomposition, and assume that B is a parent of two child states, identified as B1 and B2. Finally, as discussed, assume that two variables are required to store information that identifies the active state of the model (e.g., a variable used to identify the active leaf state of A, and a variable used to identify the active leaf state of B).

For the purposes of continuing this example, assume that a user of user device 210 has provided input indicating that coverage is to be a factor that impacts how the program code, for querying the active state of the model, is generated. Also, assume that user device 210 executes the model and determines that A1 is active 90% of the time that A is active, and that A2 is active 10% of the time A is active. Further, assume that user device 210 determines that B1 is active 20% of the time B is active, and that B2 is active the remaining 80% of the time B is active. Finally, assume that user device 210 has received input indicating that the numbering scheme is to be determined (e.g., user device 210 has received input indicating that program code for querying the active state is to be generated).

User device 210 may determine a set of leaf states to be included in the numbering scheme (e.g., a set of leaf states A1, A2, B1, and B2) based on the structure of the model. User device 210 may also determine an organization of the numbering scheme, for each of the two required variables, based on the information identifying the metric (e.g., coverage of each leaf state).

For a first variable (e.g., a variable associated with identifying the active leaf state of A) user device 210 may determine that A1 is to be listed before A2 within the numbering scheme (e.g., because A1 has 90% coverage of A). User device 210 may also determine a value that is to be associated with A1 (e.g., a integer value, such as 1U) and A2 (e.g., an integer value, such as 2U) for the first variable.

Similarly, for a second variable (e.g., a variable associated with the identifying the active leaf state of B), user device 210 may determine that B2 is to be listed before B1 within the numbering scheme (e.g., because B2 has 80% coverage of B). User device 210 may also determine a value that is to be associated with B1 and B2 for the second variable (e.g., B2 may be assigned a value of 1U, B1 may be assigned a value of 2U).

As shown in FIG. 4, process 400 may include encoding the leaf states based on the numbering scheme and the set of variables (block 450). For example, user device 210 may encode the leaf states based on the numbering scheme, determined by user device 210, and the set of variables associated with the model. In some implementations, user device 210 may encode the leaf states when user device 210 determines the numbering scheme for encoding the leaf states. Additionally, or alternatively, user device 210 may encode the leaf states when user device 210 receives input, via user device 210, indicating that the leaf states are to be encoded (e.g., when user device 210 receives input indicating that program code for querying the active state is to be generated).

Encoding leaf states may refer to generating information (e.g., a set of computer-readable instructions), that indicates an association between a leaf state and a value (e.g., an integer value), and storing the association. In some implementations, the associations may be stored in a memory location associated with a variable (e.g., a variable used to store information that identifies an active state of a model). In some implementations, multiple leaf states may be encoded, and the multiple leaf states may correspond to one variable. In some implementations, user device 210 may encode leaf states for multiple variables (e.g., when more than one variable is required to store information that identifies the active state of the model). In some implementations, user device 210 may encode the leaf states based on the numbering scheme determined by user device 210. Additionally, or alternatively, user device 210 may encode sub-states (e.g., child states) that are not leaf states. The leaf states and the sub-states that are not leaf states may be encoded in a different manner, in some implementations. User device 210 may use a single encoding scheme or a combination of encoding schemes to perform the encoding.

In some implementations, information indicating that a leaf state is active (e.g., a value associated with a leaf state) may be stored in the memory location associated with the variable. In some implementations, program code for querying the active state of the model may cause user device 210 to query the variable (e.g., read the value of the variable from the memory location) to determine the active leaf state. In some implementations, information resulting from encoding the leaf states may include information associated with a time when no leaf states are active (e.g., a variable used to store information identifying the active state may be assigned a value of 0U).

As an example, assume that user device 210 has determined the numbering scheme discussed above: a first variable is to be used to store the active leaf state of state A, and state A includes states A1 and A2 (e.g., assigned a value of 1U and 2U, respectively), a second variable is to be used to store the active leaf of state B, and state B includes states B1 and B2 (e.g., assigned a value of 2U and 1U, respectively). User device 210 may encode the leaf states in the following form:

```
//A_active_leaf
#define no_active_leaf 0U
#define A1 1U
#define A2 2U
//B_active_leaf
#define no_active_leaf 0U
#define B2 1U
#define B1 2U.
```

As shown, each leaf state of state A (e.g., A1, A2) may be assigned a value (e.g., 1U, 2U, respectively) associated with a variable (e.g., A_active_leaf) used to store information that identifies the active leaf state of state A. Similarly, each leaf state of state B (e.g., B1, B2) may be assigned a value (e.g., 2U, 1U, respectively) associated with a variable (e.g., B_active_leaf) used to store information that identifies the active leaf state of state B. As also shown, each variable may be assigned a value (e.g., 0U) when no leaf state is active. The "no_active_leaf" state may be part of the encoding scheme, and may be selected as being adjacent to (e.g., based on a metric) a state that is identified as the initially active state, in some implementations. The encoded leaf states may be stored in a memory location associated with each variable. Program code, used to query the active state of the model, may query the value (e.g., determine the value) of a variable (e.g., A_active_leaf and/or B_active_leaf) to determine the active leaf state of the model. For example, if the program code queries the value of the variable identified as A_active_leaf, and the A_active_leaf variable has a value of 1U, then A1 is the active leaf state of A.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel. Further, one or more blocks of process 400 may be omitted in some implementations.

Figure 5B:
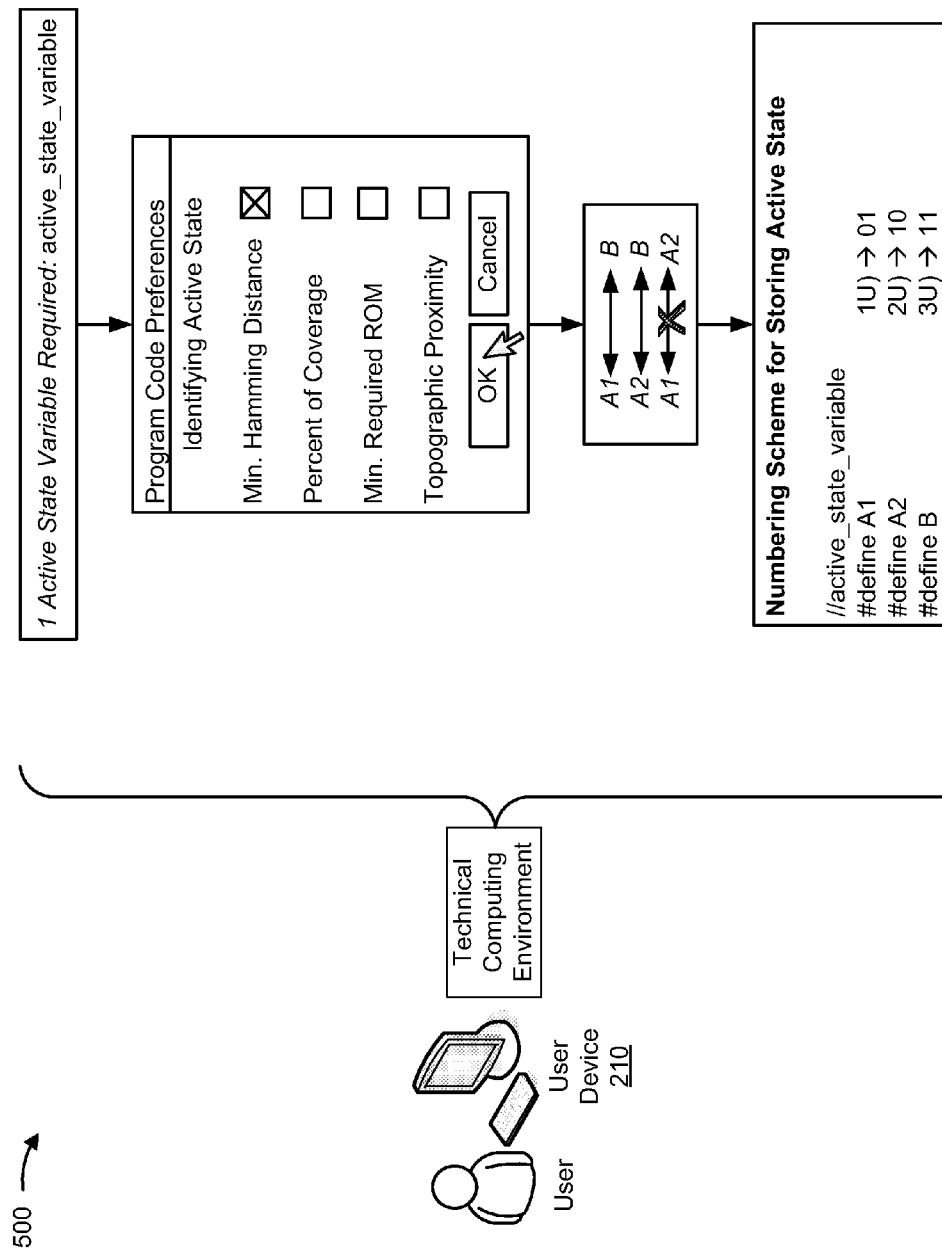

FIGS. 5A and 5B are diagrams of an example implementation 500 relating to example process 400 shown in FIG. 4. For the purposes of example implementation 500, assume that a user of user device 210 has created a model, identified as Model1, that includes two parent states (e.g., A and B), and two child states (e.g., two child states of A, identified as A1 and A2).

As shown in FIG. 5A, user device 210 may determine the set of variables required to store information that identifies the active state of Model1. As shown, the model has XOR decomposition (e.g., A or B may active at a particular time). As further shown, state A also has XOR decomposition (e.g., A1 cannot be active when A2 is active, A2 cannot be active when A1 is active). The XOR decomposition of Model1 and the XOR decomposition of A imply that B cannot be active when A1 or A2 is active, A1 cannot be active when B or A2 is active, and A2 cannot be active when A1 or B is active. As such, only one leaf state (e.g., A1, A2, or B) can be active at a particular time. Therefore, user device 210 may determine that only one variable is required to identify the active leaf state of Model1. As shown, user device 210 may assign a default name to the variable (e.g., active_state_variable).

As shown in FIG. 5B, the user of user device 210 may interact with a user interface, displayed on a display screen of user device 210, to provide information identifying a metric to be associated with generating the program code for querying the active state of Model1. As shown, the user interface may display information associated with one or more metrics (e.g., a minimum hamming distance, a percent of coverage, a minimum required ROM, and a topographic proximity) that may impact how the program code is generated. As further shown, the user may interact with an input element (e.g., a checkbox, a list box, etc.) to indicate that a metric is to impact how the program code is generated. For example, assume that the user has selected "minimum hamming distance" as the metric, as shown. As shown, the user may confirm the information identifying the metric (e.g., by clicking an "OK" button).

As further shown in FIG. 5B, the user device may determine a numbering scheme for encoding the leaf states of Model1 based on the metric and information associated with the structure of Model1. As shown, user device 210 may determine (e.g., based on information associated with transitions between states included in Model1), that state A1 may transition to state B, and that state B may transition to state A1. User device 210 may also determine that state A2 may transition to state B, and that state B may transition to state A2. Finally, user device 210 may determine that state A1 may not transition to state A2 and may determine that state A2 may not transition to state A1.

As further shown in FIG. 5B, user device 210 may determine a numbering scheme based on the minimum hamming distance and the structure of the model. User device 210 may determine that hamming distance (e.g., the number of bit flips that must take place to change the information, stored by the user device, that identifies the active state when the active leaf state changes) is minimized when state A1 is assigned a value of 1U, state A2 is assigned a value of 2U, and state B is assigned a value of 3U.

For example, user device 210 may determine that when A1 is the active leaf state, the value of active_state_variable is to be 1U (e.g., represented in binary form as 01). As discussed, state A1 may only transition to state B (e.g., A1 may not transition to state A2). User device 210 may then determine that the value of active_state_variable is to be 3U (e.g., represented in binary form as 11) when state B is the active leaf state because a transition from state A1 to state B results in one bit flip (e.g., from 01 to 11) to the value stored by active_state_variable.

Similarly, user device 210 may determine that the value of active_state_variable is to be 2U (e.g., represented in binary form as 10) when state A2 is the active leaf state. As discussed, state A2 may transition to state B, but A2 may not transition to state A1. Therefore, a transition from state A2 (e.g., represented in binary form as 10) to state B (e.g., represented in binary form as 11) also results in one bit flip to the value stored by active_state_variable. Using this logic, a transition from state B, to either state A1 or state A2, results in one bit flip to the value stored by active_state_variable (e.g., from 11 to 01, or from 11 to 10).

In this manner, the numbering scheme determined by user device 210 may be based on the information identifying the metric (e.g., a minimum hamming distance between transitions) and may also be based on the structure of the model (e.g., transitions associated with the states included in the model). As further shown, user device 210 may encode the leaf states, based on the numbering scheme, and may store the encoded leaf states in a memory location associated with user device 210 (e.g., for use when the program code for querying the active leaf state of Model1 is generated and/or executed).

As indicated above, FIGS. 5A and 5B are provided merely as an example. Other examples are possible and may differ from what was described with regard to FIGS. 5A and 5B.

FIG. 6 is a flow chart of an example process 600 for generating program code for querying an active state of a model of a finite state machine. In some implementations, one or more process blocks of FIG. 6 may be performed by user device 210. In some implementations, one or more process blocks of FIG. 6 may be performed by another device or a group of devices separate from or including user device 210, such as server device 230.

As shown in FIG. 6, process 600 may include determining a set of encoded leaf states (block 610). For example, user device 210 may determine a set of encoded leaf states associated with a model received by user device 210. In some implementations, user device 210 may determine the set of encoded leaf states when user device 210 receives input, via user device 210, indicating that the set of leaf states is to be determined (e.g., when user device 210 receives input indicating that program code for querying the active state is to be generated).

In some implementations, user device 210 may determine the set of encoded leaf states based on information, associated with one or more encoded leaf states, stored in a memory location associated with user device 210. In some implementations, user device 210 may determine the set of encoded leaf states based on receiving, from another device (e.g., server device 230), information associated with one or more encoded leaf states.

As further shown in FIG. 6, process 600 may include determining a statement type for querying an active state of states identified in a model of a finite state machine (block 620). For example, user device 210 may determine a statement type to be included in program code for querying the active state of a model received by user device 210. In some implementations, user device 210 may determine the statement type based on determining the set of encoded leaf states associated with the model. In some implementations, user device 210 may determine the statement type when user device 210 receives input, via user device 210, indicating that the statement type is to be determined (e.g., when user device 210 receives input indicating that program code for querying the active state is to be generated).

In some implementations, the statement type may include a statement, in the form of computer programming language, that, when executed, may identify the active state of a model. In some implementations, the statement type may include a conditional statement (e.g., an IF statement, a SWITCH statement, etc.), or another statement type that may be used to identify the active state of a model.

In some implementations, user device 210 may determine the statement type based on the set of encoded leaf states. For example, user device 210 may determine that an if statement is to be used to identify the active leaf state of a state when a range of values (e.g., a range of values included in a numbering scheme) that corresponds to the state being active satisfies a threshold (e.g., where the range of values indicating that a state is active is greater than or equal to three, user device 210 may determine that an if statement is to be used). Additionally, or alternatively, user device 210 may determine that a switch statement is to be used to identify the active leaf state of the state where the range of values that corresponds to the particular state being active does not satisfy the threshold (e.g., where the range of values indicating that a state is active is less than three, user device 210 may determine that a switch statement is to be used).

In some implementations, user device 210 may determine the statement type based on information identifying a metric that is to be associated with generating the program code for querying the active state of the model. For example, user device 210 may determine that the statement type (e.g., an if statement, a switch statement, etc.) is to be used where a user of user device 210 provides information indicating that a particular metric (e.g., minimizing a quantity of ROM required to store the program code, maximizing execution speed, etc.) is to impact how the program code is generated. Additionally, or alternatively, the user may provide (e.g., via user device 210) information indicating that a particular statement type is to be used within the program code (e.g., the user may wish for the program code to include only switch statements, the user may wish for the program code to include only if statements, the user may select a statement type to be incorporated into the program code for querying a particular variable, etc.).

Additionally, or alternatively, user device 210 may determine the statement type based on the structure of the model. For example, user device 210 may determine that an if statement is to be included in program code associated with a parent state that includes child states, where the child states are also parent states. As another example, user device 210 may determine that a switch statement is to be included in program code associated with a parent state that includes child states, where the child states are not parent states.

As further shown in FIG. 6, process 600 may include generating program code for querying the active state based on the statement type and the set of encoded leaf states (block 630). For example, user device 210 may generate program code for querying the active state based on the statement type, determined by user device 210, and the set of encoded leaf states, determined by user device 210. In some implementations, user device 210 may generate the program code based on input, provided by a user of user device 210, indicating that the program code is to be generated. Additionally, or alternatively, user device 210 may generate the program code based on information received from another device (e.g., server device 230).

In some implementations, the program code may be generated based on the set of encoded leaf states and the statement type. For example, user device 210 may determine the set of encoded leaf states (e.g., the set of encoded leaf states identifying a variable, a group of leaf states, and a value assigned to each of the group of leaf states) and the statement type (e.g., an if statement, a switch statement, etc.), and user device 210 may generate the program code for querying the active state of the model that includes the set of encoded leaf states and the statement type.

In some implementations, the program code may be generated based on existing program code. For example, user device 210 may receive existing program code for querying the active state of the model, and user device 210 may modify the existing program code and/or generate new program code based on the existing program code. In some implementations, a statement (e.g., a switch statement) included in the existing program code may be modified (e.g., by modifying a case statement, included in the switch statement) based on the set of encoded leaf states included in the model. Additionally, or alternatively, a statement (e.g., a switch statement) included in the existing program code may be replaced with another statement (e.g., an if statement) based on the set of encoded leaf states included in the model (e.g., where the number of stacked case statements, included with a switch statement, satisfies a threshold quantity of stacked case statements).

In some implementations, the generated program code may be displayed, via a display screen of user device 210, to the user. In some implementations, the user may modify the program code and/or may add additional program code to the generated program code (e.g., the user may provide program code associated with actions to take place when a state is active, etc.). In some implementations, the user may select one or more additional and/or different metrics, and user device 210 may generate another program code (e.g., an updated program code based on the additional and/or different metrics). In some implementations, the program code, when executed by user device 210, may be used to query the active state of the model during execution of the model. As such, the user of user device 210 may determine the active state of the model during execution of the model. Knowledge of the active state of the model may be important for design purposes associated with modeling a reactive system.

Although FIG. 6 shows example blocks of process 600, in some implementations, process 600 may include additional blocks, different blocks, fewer blocks, or differently arranged blocks than those depicted in FIG. 6. Additionally, or alternatively, one or more of the blocks of process 600 may be performed in parallel. Further, one or more blocks of process 600 may be omitted in some implementations.

Figure 7A:
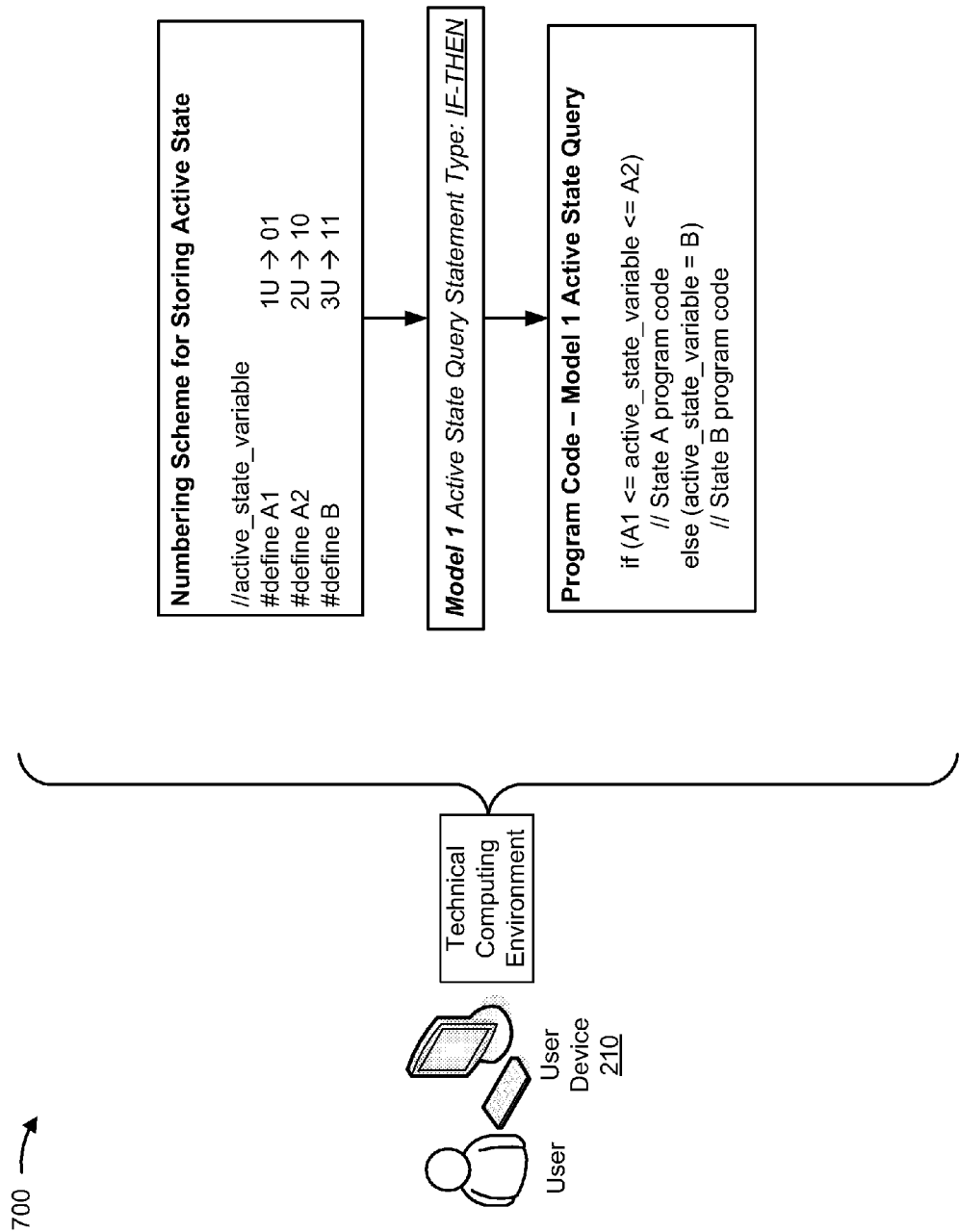
FIGS. 7A and 7B are diagrams of an example implementation relating to the example process shown in FIG. 6.
Figure 7B:
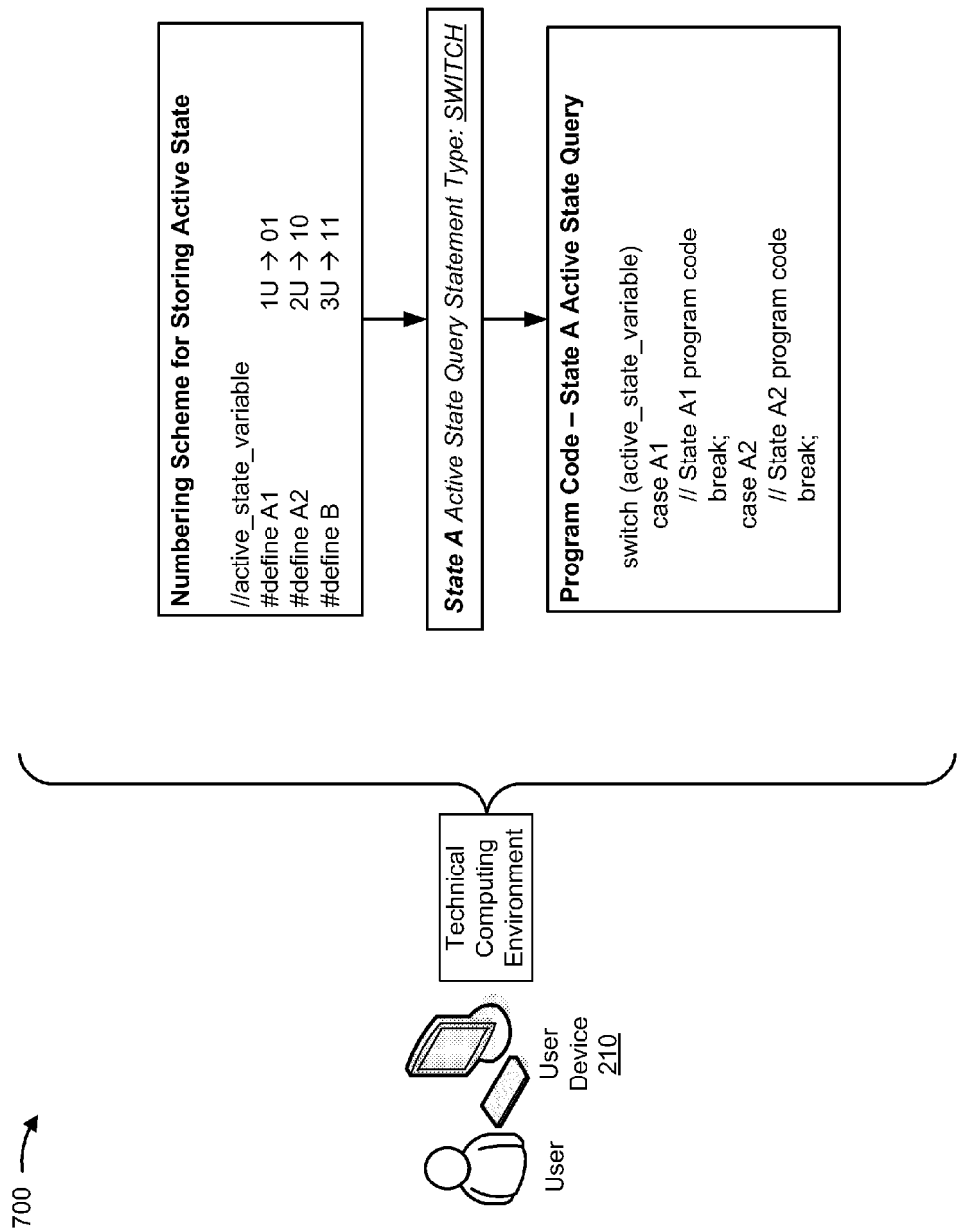

FIGS. 7A and 7B are diagrams of an example implementation 700 relating to example process 600 shown in FIG. 6. For the purposes of example implementation 700, assume that user device 210 has encoded three leaf states (e.g., A1 with a value of 1U, A2 with a value of 2U, and B with a value of 3U) associated with a model, identified as Model1.

For the purposes of FIG. 7A, assume that the user of user device 210 has indicated that user device 210 is to generate program code for querying the active state of Model 1. As shown, user device 210 may determine that an if statement is to be included in program code for querying the active state of Model1. User device 210 may determine that an if statement is to be included based on determining that the range of values (e.g., 1U, 2U, and 3U) associated with determining the active leaf of state Model1 has met a default threshold value of 3 (e.g., there are three values, corresponding to A1, A2, and B, associated with determining the active leaf of Model1).

As further shown in FIG. 7A, user device 210 may generate the program code for querying the active state of Model1 in the form of an if statement, and may display the program code to the user. As shown, the program code may indicate that where the value of active_state_variable is A1 or A2 (e.g., if (A1<=active_state_variable<=A2)), the program code will identify state A as the active state. As also shown, the program code may indicate that where the value of active_state_variable is B (e.g., else (active_state_variable=B)), the program code will identify state B as the active state. The user of user device 210 may input additional program logic associated with actions that are to take place when state A is active (e.g., by adding additional program code where "//State A program code" is shown) and/or when state B is active (e.g., by adding additional program code where "//State B program code" is shown).

For the purposes of FIG. 7B, assume that the user of user device 210 has indicated that user device 210 is to generate program code for querying the active state of state A. As shown, user device 210 may determine that a switch statement is to be included in program code for querying the active state of state A. User device 210 may determine that a switch statement is to be included based on determining that the range of values associated with determining the active leaf of state A has not met a default threshold value of 3 (e.g., there are two values, corresponding to A1, A2, associated with determining the active leaf of state A).

As further shown in FIG. 7B, user device 210 may generate the program code for querying the active state of state A in the form of a switch statement, and may display the program code to the user. As shown, the program code may indicate that where the value of active_state_variable is A1 (e.g., switch (active_state_variable)→case A1), the program code will identify state A1 as the active state. As also shown, the program code may indicate that where the value of active_state_variable is A2 (e.g., switch (active_state_variable)→case A2), the program code will identify state A2 as the active state. The user of user device 210 may input additional program code associated with actions that are to take place when state A1 is active (e.g., by adding additional program language where "//State A1 program code" is shown) and/or when state A2 is active (e.g., by adding additional program language where "//State A2 program code" is shown).

As indicated above, FIGS. 7A and 7B are provided merely as an example. Other examples are possible and may differ from what was described with regard to FIGS. 7A and 7B.

Figure 8A:
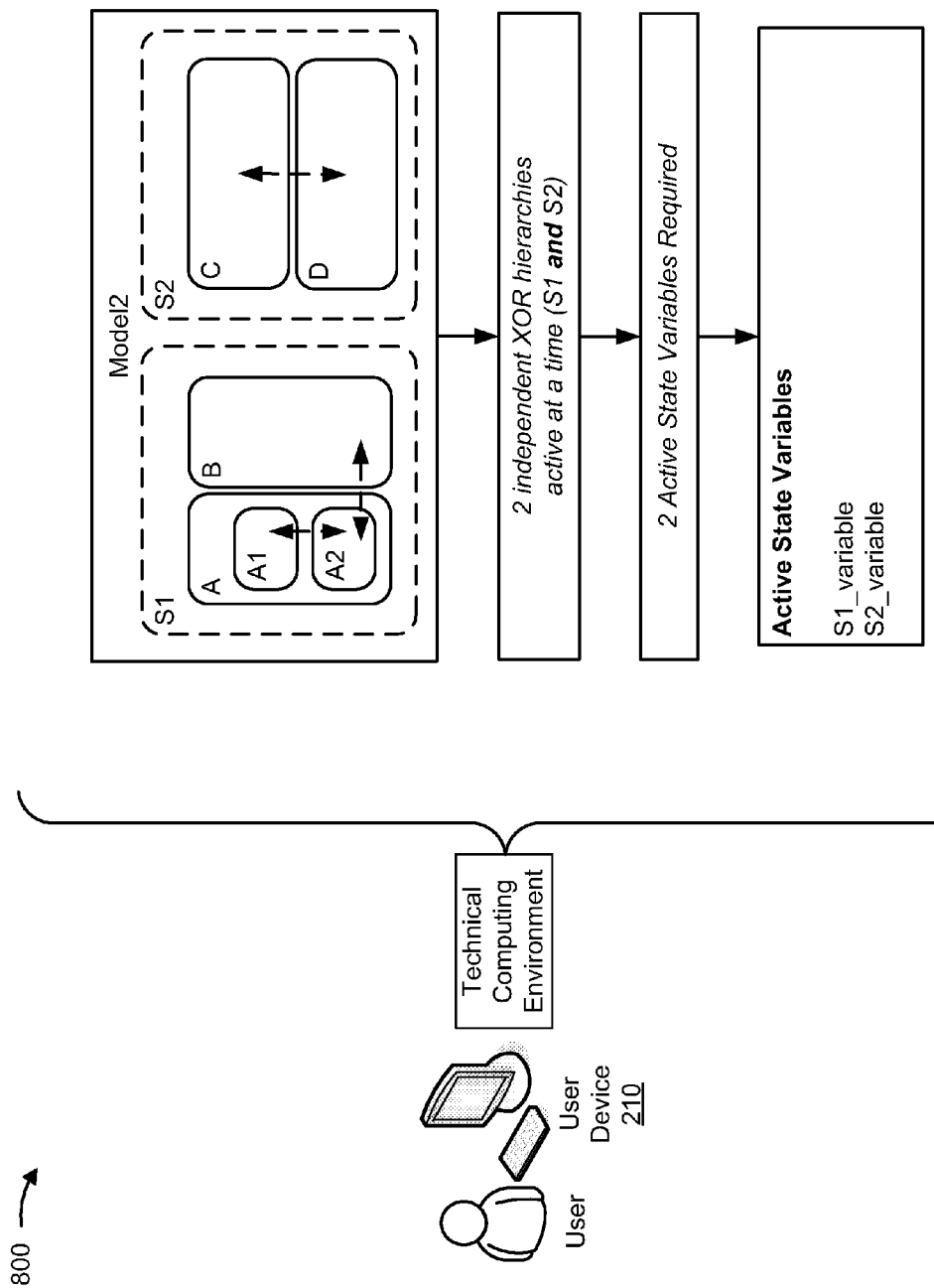
FIGS. 8A-8C are diagrams of an example implementation relating to the example processes shown in FIG. 4 and FIG. 6.
Figure 8B:
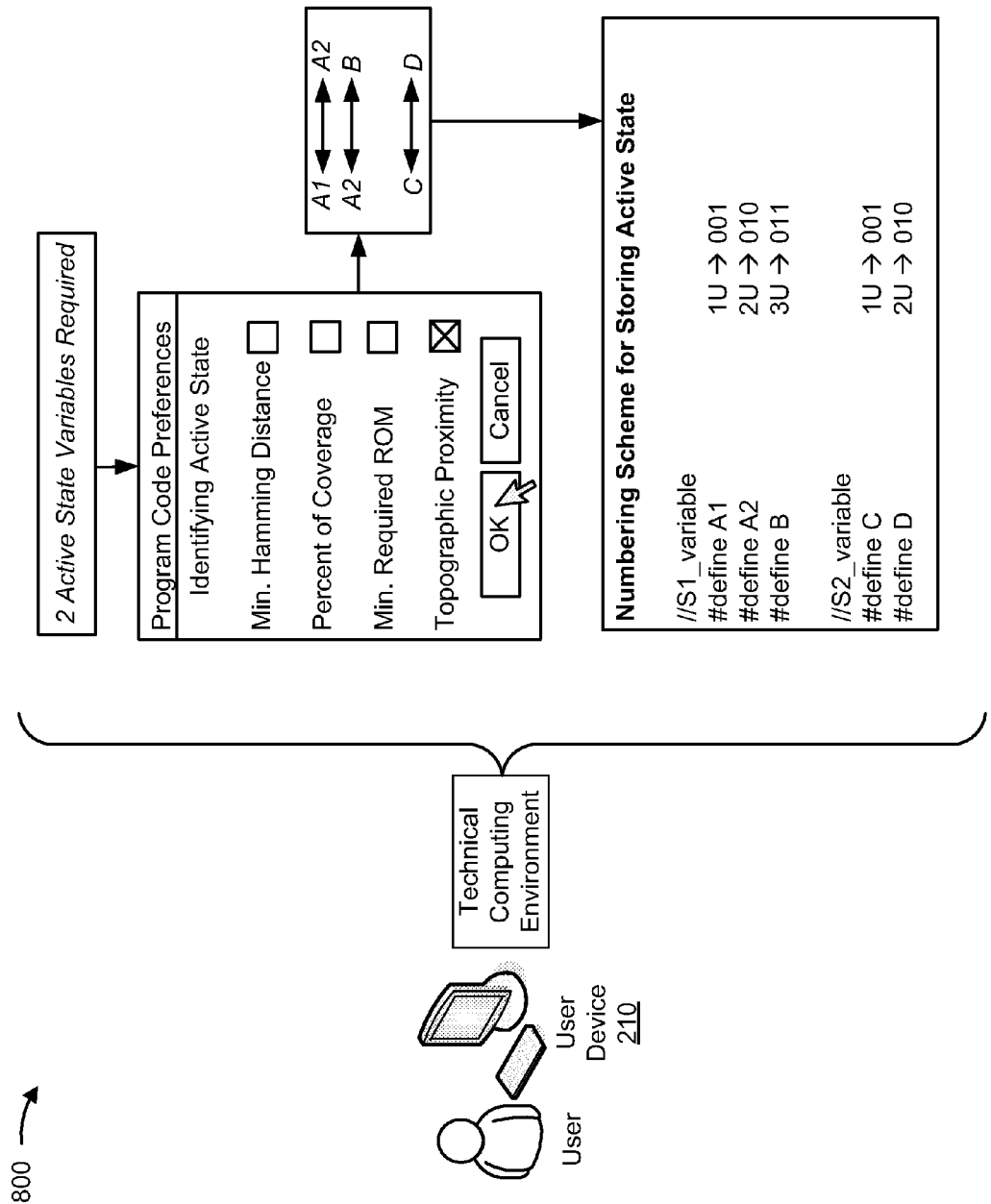
Figure 8C:
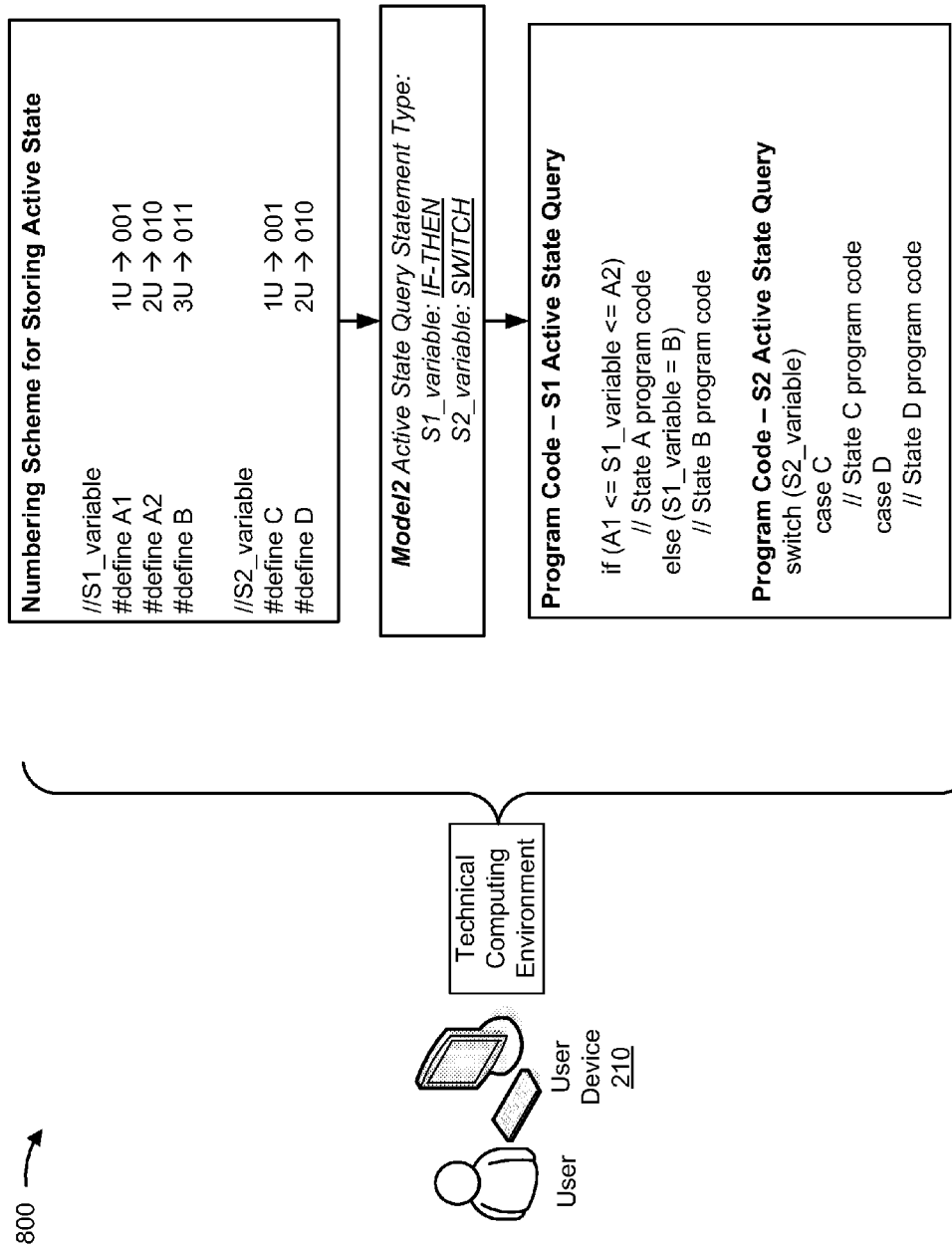

FIGS. 8A-8C are diagrams of an example implementation 800 relating to example processes 400 and 600 shown in FIG. 4 and FIG. 6, respectively. For the purposes of example implementation 800, assume that a user of user device 210 has created a model, identified as Model2. Further, assume that the user of user device 210 has provided information indicating that user device 210 is to generate program code for querying the active state of Model2.

As shown in FIG. 8A, user device 210 may determine the set of variables required to store information that identifies the active state of Model2. As shown, Model2 has Parallel (AND) decomposition (e.g., child states S1 and S2 may be concurrently active). As also shown, S1 has XOR decomposition (e.g., child state A or B may be active at a particular time). As further shown, A has XOR decomposition (e.g., child state A1 or A2 may be active at a particular time). The XOR decomposition of S1 implies that B cannot be active when A1 or A2 is active, A1 cannot be active when B or A2 is active, and A2 cannot be active when A1 or B is active. As such, only one leaf state of S1 (e.g., A1, A2, or B) can be active at a time.

As further shown in FIG. 8A, state S2 has XOR decomposition (e.g., child state C or D may be active at a particular time). The XOR decomposition of S2 implies that C cannot be active when D is active, and D cannot be active when C is active. As such, only one leaf state of S2 (e.g., C or D) can be active at a time. User device 210 may determine that two variables are required to identify the active state of Model2 because there are two XOR hierarchies (e.g., S1 and S2) that may be concurrently active (e.g., because of the parallel (AND) decomposition of Model2). As shown, user device 210 may assign a default name to the variables (e.g., S1 variable and S2 variable).

As shown in FIG. 8B, the user of user device 210 may interact with a user interface, displayed on a display screen of user device 210, to provide information identifying a metric to be associated with generating the program code for querying the active state of Model2. As shown, the user interface may display information associated with one or more metrics (e.g., a hamming distance, a percent of coverage, a minimum amount of required ROM, and a topographic proximity) that may impact how the program code is generated. As shown, the user may interact with an input element (e.g., a checkbox, a list box, etc.) to indicate that a metric is to impact how the program code is generated. For example, assume that the user has selected "topographic proximity" as the metric, as shown. As shown, the user may confirm the information identifying the metric (e.g., by clicking an "OK" button).

As further shown in FIG. 8B, user device 210 may determine a numbering scheme for encoding the leaf states of Model2 based on the metric and information associated with the structure of Model2. As shown, user device 210 may determine (e.g., based on the structure of Model2), that, within S1, A1 may transition to A2, and may determine that A2 may transition to A1. User device 210 may also determine that A2 may transition to B, and may determine that B may transition to A2. As further shown, user device 210 may determine that, within S2, C may transition to D, and may determine that D may transition to C. For the purposes of example implementation 800, assume that no other transitions are possible.

As further shown in FIG. 8B, user device 210 may determine a numbering scheme based on the topographic proximity and the structure of the model.

For example, user device 210 may determine that when A1 is the active leaf state of state S1, the value of S1_variable is to be 1U. User device 210 may determine that the value of S1_variable is to be 2U when state A2 is the active leaf state of S5 (e.g., state A1 and A2 should be adjacent to each other in the numbering scheme because each is a child of state A and A1 may transition to A2). Furthermore, user device 210 may determine that the value of S1_variable is to be 3U when B is the active leaf of state S1 (e.g., state B should be adjacent to state A2 because state A2 may transition to state B). Similarly, user device 210 may determine that the value of S2_variable is to be 1U when state C is the active leaf state of state S2, and may determine that the value of S2_variable is to be 2U when state D is the active leaf state of S2.

In this manner, the numbering scheme determined by user device 210 may be based on the information identifying the metric (e.g., a topographic proximity between states of the model). As further shown, user device 210 may encode the leaf states, based on the numbering scheme, and may store the encoded leaf states in a memory location of user device 210 (e.g., for use when the program code for querying the active leaf state of Model2 is generated and/or executed).

As shown in FIG. 8C, user device 210 may determine that an if statement is to be used for program code for querying the active state of state S1. User device 210 may determine that an if statement is to be used based on determining that the range of values associated with determining that active leaf of state S1 has met a default threshold value of 3 (e.g., there are three values associated with determining the active leaf of state S1).

As further shown in FIG. 8C, user device 210 may generate the program code for querying the active state of S1 in the form of an if statement, and may display the program code to the user. As shown, the program code may indicate that where the value of S1_variable is A1 or A2 (e.g., if (A1<=S1_variable<=A2)), the program code will identify state A as the active state. As also shown, the program code may indicate that where the value of S1_variable is B (e.g., else (S1_variable=B)), the program code will identify state B as the active state. The user of user device 210 may input additional program code that indicate actions that are to take place when state A is active (e.g., by inputting additional program code where "//State A program code" is shown) and/or when state B is active (e.g., by inputting additional program code where "//State B program code" is shown).

As further shown in FIG. 8C, user device 210 may determine that a switch statement is to be used for program code for querying the active state of state S2. User device 210 may determine that a switch statement is to be used based on determining that the range of values associated with determining that active leaf of state S2 has not met a default threshold value of 3 (e.g., there are two values associated with determining the active leaf of state S2).

As shown, user device 210 may generate the program code for querying the active state of state S2 in the form of a switch statement, and may display the program code to the user. As shown, the program code may indicate that where the value of S2_variable is C (e.g., switch (S2_variable)→case C), the program code will identify state C as the active state. As also shown, the program code may indicate that where the value of S2_variable is D (e.g., switch (S2_variable)→case D), the program code will identify state D as the active state. The user of user device 210 may input additional program code associated with actions that are to take place when state C is active (e.g., by inputting additional program code where "//State C program code" is shown) and/or when state D is active (e.g., by inputting additional program code where "//State D program code" is shown).

As indicated above, FIGS. 8A-8C are provided merely as an example. Other examples are possible and may differ from what was described with regard to FIGS. 8A-8C.

Figure 9A:
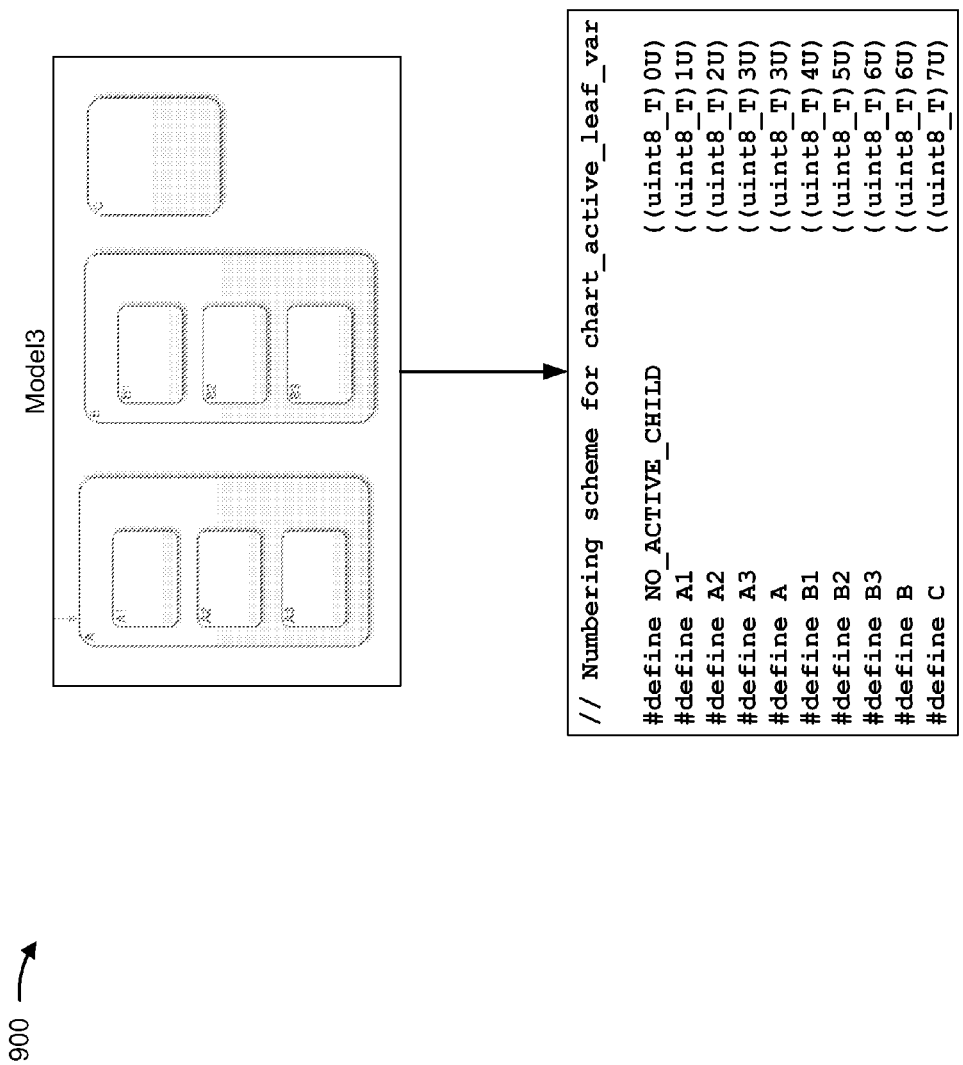

FIGS. 9A and 9B are diagrams of an additional example implementation 900 relating to example processes 400 and 600 shown in FIG. 4 and FIG. 6, respectively. For the purposes of example implementation 900, assume that a user of user device 210 has created a model, identified as Model3. Further, assume that the user of user device 210 has provided information indicating that user device 210 is to generate program code for querying the active state of Model3.

As shown in FIG. 9A, user device 210 may determine (e.g., based on the XOR decomposition of Model3, state A, and state B) that one variable, chart_active_leaf_var, is required to store information identifying the active state of Model3. As further shown, user device 210 may determine a numbering scheme for encoding the leaf states of Model3.

As further shown in FIG. 9A, user device 210 may encode state A and state B using the numbering scheme (e.g., rather than encoding only leaf states), and may assign a value to state A and may assign a value to state B. The value assigned to state A may be identical to the value assigned to state A3 (e.g., 3U), and the value assigned to state B may be identical to the value assigned to state B3 (e.g., 6U), as shown (e.g., a parent state may not require a unique value because the parent state is known to be active when any child state of the parent state is active).

As shown in FIG. 9B, user device 210 may define constants IN_A1 as having a value of 1U, may define IN_A2 as having a value of 2U, may define IN_A3 as having a value of 3U, may define IN_A_MIN as having a value equal to the value of IN_A1 (e.g., 1U), and may define IN_A_MAX as having a value equal to the value of IN_A3 (e.g., 3U). User device 210 may define these constants to increase readability of the generate program code.

As further shown in FIG. 9B, user device 210 may generate the program code for querying the active state of the model using an if statement. As also shown, user device 210 may generate program code for querying the active state of state A using a switch statement. User device 210 may generate each program code based on the defined constants (e.g., to increase readability of the program code).

As indicated above, FIGS. 9A and 9B are provided merely as an example. Other examples are possible and may differ from what was described with regard to FIGS. 9A and 9B.

Figure 10:
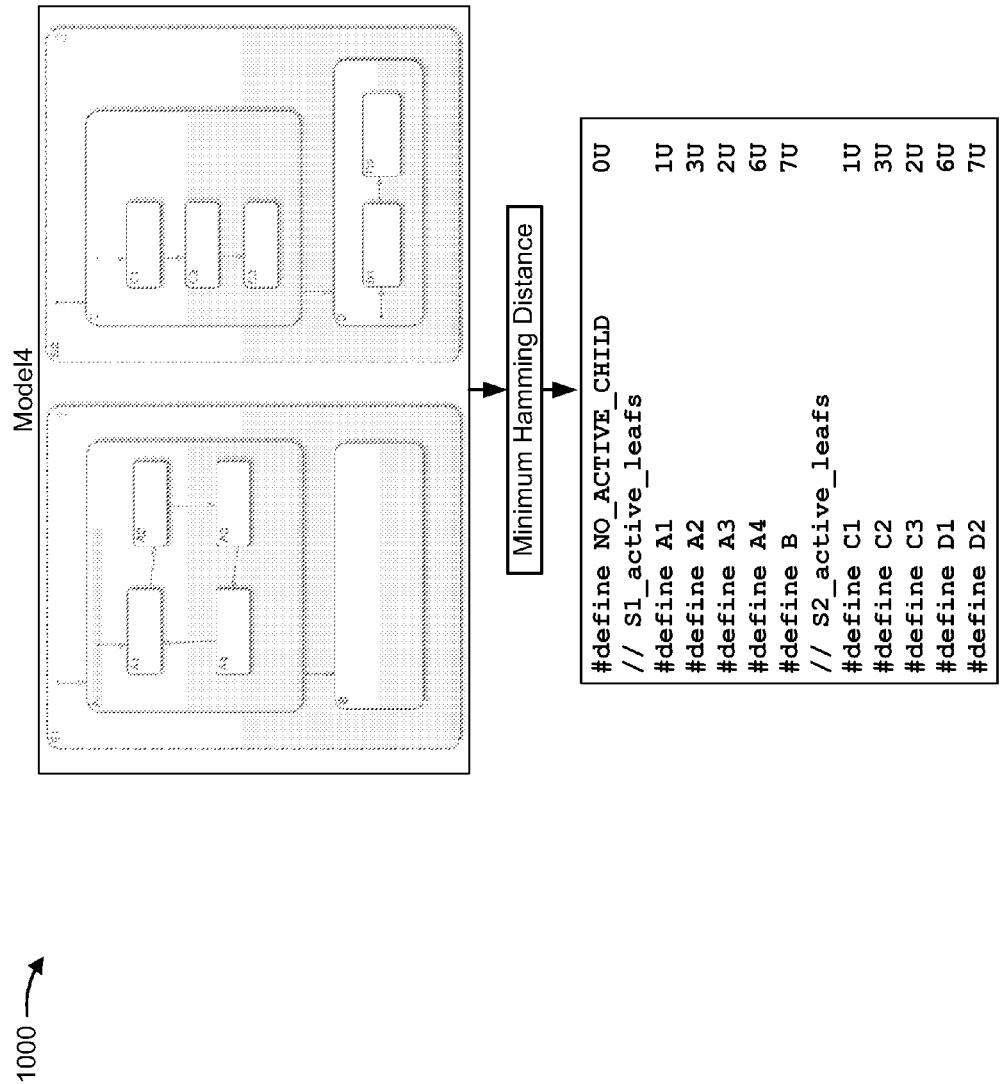
FIG. 10 is a diagram of another example implementation relating to the example process shown in FIG. 4 and FIG. 6.

FIG. 10 is a diagram of another example implementation 1000 relating to example processes 400 and 600 shown in FIG. 4 and FIG. 6, respectively. For the purposes of example implementation 1000, assume that a user of user device 210 has created a model, identified as Model4. Further, assume that the user of user device 210 has provided information indicating that user device 210 is to determine and encode a numbering scheme associated with the leaf states of Model4.

As shown in FIG. 10, user device 210 may determine (e.g., based on the parallel (AND) decomposition of Model4, and the XOR decomposition of states S1, S2, A, C, and D) that two variables, identified as S1_active_leafs and S2_active_leafs, are required to store information identifying the active state of Model4.

As further shown in FIG. 10, user device 210 may determine the numbering scheme for Model4 based on a metric associated with minimizing a hamming distance between values associated with each leaf state. As shown, user device 210 may organize the numbering scheme for each variable in such a way that the hamming distance between the values associated with each leaf state of S1 and S2 is minimized (e.g., one bit flip is required to change the value from 1U to 3U, one bit flip is required to change the value from 3U to 2U, one bit flip is required to change the value from 2U to 6U, etc.).

User device 210 may encode the leaf states of Model4 based on the numbering scheme. User device 210 may also determine a statement type to be included in program code for querying the active state of Model4, and may generate the program code for querying the active state based on the statement type and the encoded leaf states.

As indicated above, FIG. 10 is provided merely as an example. Other examples are possible and may differ from what was described with regard to FIG. 10.

Implementations described herein may allow a user device to generate, based on one or more metrics, program code for querying an active state of a model that may reduce a quantity of memory used to identify an active state of the model.

The foregoing disclosure provides illustration and description, but is not intended to be exhaustive or to limit the implementations to the precise form disclosed. Modifications and variations are possible in light of the above disclosure or may be acquired from practice of the implementations.

As used herein, component is intended to be broadly construed as hardware, firmware, or a combination of hardware and software.

As used herein, program code is to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, program code may include different combinations of the above-identified classes (e.g., text-based code, binary code, text files, etc.). Additionally, or alternatively, program code may include code generated using a dynamically-typed programming language (e.g., the M language, a MATLAB® language, a MATLAB-compatible language, a MATLAB-like language, etc.) that can be used to express problems and/or solutions in mathematical notations. Additionally, or alternatively, program code may be of any type, such as a function, a script, an object, etc., and a portion of program code may include one or more characters, lines, etc. of the program code.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
memory; and
one or more processors, in communication with the memory, executing instructions to:
receive information that identifies a model of a finite state machine,
the model including information that identifies a plurality of leaf states,
the plurality of leaf states including states of the model that have no child states;
determine, based on the information that identifies the model, one or more variables for storing information that identifies an active state of the model;
determine a numbering scheme for encoding the plurality of leaf states,
the numbering scheme being based on the one or more variables; and
encode the plurality of leaf states based on the numbering scheme,
wherein encoding the plurality of leaf states comprises generating and storing information indicating an association between a leaf state and a value.

2. The device of claim 1, where the one or more processors are further to:
determine that a state, included in the model, has XOR decomposition; and
where the one or more processors, when determining the one or more variables for storing the information that identifies the active state of the model, are further to:
determine the one or more variables based on determining that the state has XOR decomposition.

3. The device of claim 1, where the one or more processors are further to:
determine that a state, included in the model, has parallel (AND) decomposition; and
where the one or more processors, when determining the one or more variables for storing the information that identifies the active state of the model, are further to:
determine the one or more variables based on determining that the state has parallel (AND) decomposition.

4. The device of claim 1, where the one or more processors are further to:
identify one or more hierarchies based on the states included in the model,
where each hierarchy, of the one or more hierarchies, includes a group of states comprising a parent state and sub-states, at one or more levels, of the parent state, having XOR decomposition;
determine a maximum quantity of hierarchies, of the one or more hierarchies, that can be concurrently active;
determine a quantity of variables equal to the maximum quantity of hierarchies; and
where the one or more processors, when determining the one or more variables for storing the information that identifies the active state of the model, are further to:
determine the one or more variables based on the quantity of variables.

5. The device of claim 1, where the one or more processors are further to:
   receive information identifying a metric associated with generating program code for querying the active state of the model; and
   where the one or more processors, when determining the numbering scheme for encoding the plurality of leaf states, are further to:
      determine the numbering scheme based on the metric.

6. The device of claim 1, where the one or more processors, when encoding the plurality of leaf states, are further to:
   determine one or more encoded leaf states based on encoding the plurality of leaf states;
   determine a statement type associated with generating program code for querying the active state of the model; and
   generate the program code based on the statement type and the one or more encoded leaf states.

7. The device of claim 6, where the one or more processors are further to:
   identify a metric associated with generating the program code; and
   where the one or more processors, when determining the statement type associated with generating the program code, are further to:
      determine the statement type based on the metric.

8. A non-transitory computer-readable medium storing instructions, the instructions comprising:
   one or more instructions that, when executed by one or more processors, cause the one or more processors to:
      determine information that identifies a model of a finite state machine,
         the model including information that identifies states of the model, including a plurality of leaf states,
            the plurality of leaf states including states of the model that have no child states;
      determine that a state, included in the model, has XOR decomposition;
      determine a quantity of variables based on determining that the state has XOR decomposition;
      determine, based on the quantity of variables, one or more variables for storing information that identifies an active state of the model;
      generate, based on the one or more variables, a numbering scheme;
      generate, based on the numbering scheme, information indicating an association between a leaf state, of the plurality of leaf states, and a value; and
      store the generated information.

9. The non-transitory computer-readable medium of claim 8, where the one or more instructions, when executed by the one or more processors, further cause the one or more processors to:
   identify one or more hierarchies based on the states included in the model,
      where each hierarchy, of the one or more hierarchies, includes a group of states comprising a parent state and sub-states, at one or more levels, of the parent state, having XOR decomposition;
   determine a maximum quantity of hierarchies, of the one or more hierarchies, that may be concurrently active;
   determine a quantity of variables equal to the maximum quantity of hierarchies; and
   where the one or more instructions, that cause the one or more processors to determine the one or more variables for storing the information that identifies the active state of the model, further cause the one or more processors to:
      determine the one or more variables based on the quantity of variables.

10. The non-transitory computer-readable medium of claim 8, where the one or more instructions, when executed by the one or more processors, further cause the one or more processors to:
   receive information identifying a metric associated with generating the numbering scheme; and
   where the one or more instructions that cause the one or more processors to generate the numbering scheme, further cause the one or more processors to:
      generate the numbering scheme based on the information identifying the metric.

11. The non-transitory computer-readable medium of claim 10, where the metric includes information associated with one or more of:
   an amount of power consumption;
   an execution speed;
   a hamming distance;
   a topographic proximity;
   an amount of coverage;
   an amount of ROM; or
   an amount of RAM.

12. The non-transitory computer-readable medium of claim 8, where the one or more instructions, when executed by the one or more processors, further cause the one or more processors to:
   determine that a leaf state, of the plurality of leaf states, is to be associated with a variable, of the one or more variables;
   determine that a value is to be associated with the leaf state; and
   where the one or more instructions, that cause the one or more processors to generate the numbering scheme, further cause the one or more processors to:
      generate the numbering scheme based on the value, the leaf state, and the variable.

13. The non-transitory computer-readable medium of claim 8, where the one or more instructions, that cause the one or more processors to generate the information indicating the association between the leaf state, of the plurality of leaf states, and the value, further cause the one or more processors to:
   determine one or more leaf states in the plurality of leaf states;
   determine a statement type associated with generating program code for querying the active state of the model; and
   generate the program code based on the statement type and the one or more leaf states.

14. The non-transitory computer-readable medium of claim 13, where the statement type includes at least one of:
   an if statement; or
   a switch statement.

15. A method, comprising:
   determining information associated with a model of a finite state machine,
      the model including information that identifies a plurality of leaf states,
         the plurality of leaf states including states of the model that have no child states,
      the determining being performed by a device that includes one or more processors;
   identifying one or more variables for storing information that identifies an active state of the model,
      the one or more variables being based on the information associated with the model,
      the identifying being performed by the device;

generating, based on the one or more variables, a numbering scheme for encoding the plurality of leaf states, the generating being performed by the device; and encoding the plurality of leaf states based on the numbering scheme, where encoding the plurality of leaf states includes generating and storing information indicating an association between a leaf state and a value, the encoding being performed by the device.

16. The method of claim 15, further comprising:

determining that a state, included in the model, has XOR decomposition; and where identifying the one or more variables for storing the information that identifies the active state of the model further comprises:

identifying the one or more variables based on determining that the state has XOR decomposition.

17. The method of claim 15, further comprising:

determining that a state, included in the model, has parallel (AND) decomposition; and where identifying the one or more variables for storing the information that identifies the active state of the model further comprises:

identifying the one or more variables based on determining that the state has parallel (AND) decomposition.

18. The method of claim 15, further comprising:

receiving information identifying a metric associated with generating program code for querying the active state of the model; and where generating the numbering scheme for encoding the plurality of leaf states further comprises:

generating the numbering scheme based on the metric.

19. The method of claim 15, further comprising:

determining a one or more encoded leaf states based on encoding the plurality of leaf states;

determining a statement type associated with generating program code for querying the active state of the model; and generating the program code based on the statement type and the one or more encoded leaf states.

20. The method of claim 19, further comprising:

identifying a metric associated with generating the program code, the metric being based on at least one of:
an amount of power consumption,
an execution speed,
a hamming distance,
a topographic proximity,
an amount of coverage,
an amount of ROM, or
an amount of RAM; and where determining the statement type associated with generating the program code further comprises:

determining the statement type based on the metric.

* * * * *